(12) United States Patent
Ushiroda et al.

(10) Patent No.: US 7,463,964 B2
(45) Date of Patent: Dec. 9, 2008

(54) DRIVING FORCE DISTRIBUTION AND CONTROLLING APPARATUS FOR VEHICLE AND DRIVING FORCE DISTRIBUTION AND CONTROLLING METHOD FOR VEHICLE

(75) Inventors: Yuichi Ushiroda, Okazaki (JP); Koji Ando, Okazaki (JP); Naoki Takahashi, Okazaki (JP); Keiji Suzuki, Okazaki (JP); Kaoru Sawase, Anjo (JP); Takeshi Arino, Takahama (JP); Kazuhiko Aono, Kariya (JP); Tomohiro Narita, Okazaki (JP); Hisao Arita, Okazaki (JP)

(73) Assignee: Mitsubishi Jidosha Kogyo K.K., Tokyo (JP)

( * ) Notice: Subject to any disclaimer, the term of this patent is extended or adjusted under 35 U.S.C. 154(b) by 855 days.

(21) Appl. No.: 10/935,316

(22) Filed: Sep. 8, 2004

(65) Prior Publication Data

US 2005/0085988 A1 Apr. 21, 2005

(30) Foreign Application Priority Data

Sep. 9, 2003 (JP) ............................. 2003-316505
Sep. 29, 2003 (JP) ............................. 2003-338436
Sep. 29, 2003 (JP) ............................. 2003-338437

(51) Int. Cl.
*G05D 1/00* (2006.01)

(52) U.S. Cl. .......................... 701/80; 701/91

(58) Field of Classification Search ............. 701/69–91; 303/146–150; 180/197, 245–249
See application file for complete search history.

(56) References Cited

U.S. PATENT DOCUMENTS 7,162,346 B2 * 1/2007 Berry et al. .................... 701/48
7,383,910 B2 * 6/2008 Mori et al. .................. 180/245
7,398,145 B2 * 7/2008 Kato et al. ..................... 701/80

FOREIGN PATENT DOCUMENTS

| DE | 69005741 T | 4/1994 |
|---|---|---|
| DE | 19529491 | 2/1996 |
| DE | 19960805 | 6/2000 |
| DE | 10138168 | 4/2002 |
| EP | 0314452 B1 | 2/1993 |
| EP | 0911205 A2 | 4/1999 |
| EP | 1256499 A2 | 11/2002 |
| JP | 9-226558 A | 9/1997 |
| JP | 2002-96651 A | 4/2002 |

* cited by examiner

*Primary Examiner*—Richard M. Camby
(74) *Attorney, Agent, or Firm*—Birch, Stewart, Kolasch & Birch, LLP

(57) ABSTRACT

A driving force distribution and controlling apparatus and method for a vehicle is disclosed by which control interference which may occur between control by a driving force distribution mechanism and control by an antiskid brake system (ABS) is suppressed while the behavior of the vehicle is stabilized.

19 Claims, 12 Drawing Sheets

| | Road Friction | Driving Force Distribution Mechanism | Mode for Control | | |
|---|---|---|---|---|---|
| ABS: Inactive | High-$\mu$ Low-$\mu$ | Left & Right Back & Force | Driving Force Distribution prioritized Control | 1st Mode (18A) | Standard Mode (1st Mode) |
| ABS: Active | High-$\mu$ | Left & Right | Driving Force Distribution prioritized Control | 2nd Mode A (18B) | ABS Active Mode (2nd Mode) |
| | | Back & Force | ABS prioritized Control | | |
| | Low-$\mu$ | Left & Right | ABS prioritized Control | 2nd Mode B (18C) | |
| | | Back & Force | | | |

FIG. 3

| | Road Friction | Mode for Control | | |
|---|---|---|---|---|
| ABS: Inactive | High-$\mu$ Low-$\mu$ | Standard Mode (1st Mode) | Standard Controll | • $\Delta$ N Control *1<br>• ACC Control<br>• Slowdown Control<br>... |
| ABS: Active | High-$\mu$ | ABS Active Mode (2nd Mode) | High-$\mu$ & ABS Active Control | • $\Delta$ N Control *1<br>• ACC Control<br>• Slowdown Control<br>... |
| | Low-$\mu$ | | Low-$\mu$ and ABS Active Control | • $\Delta$ N Control *1 |

*1

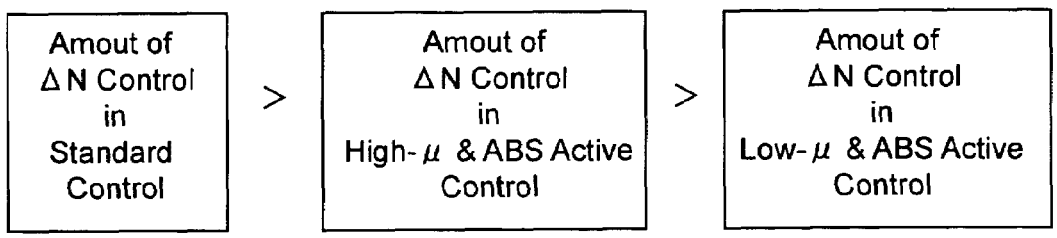

FIG. 4

| | | Mode of Control | |
|---|---|---|---|
| | | <Present Invention> | <Related Art> |
| ABS: Inactive | | 1st Mode (Standard Mode) | 1st Mode (Standard Mode) |
| ABS: Active | High-$\mu$ | | 2nd Mode (ABS prioritized Mode) |
| | Low-$\mu$ | 2nd Mode (ABS prioritized Mode) | |

FIG. 6

DRIVING FORCE DISTRIBUTION AND CONTROLLING APPARATUS FOR VEHICLE AND DRIVING FORCE DISTRIBUTION AND CONTROLLING METHOD FOR VEHICLE

This Non-provisional application claims priority under 35 U.S.C. §119(a) on patent application Ser. No(s). 2003-316505; 2003-338436; and 2003-338437 filed in Japan on Sep. 9, 2003; Sep. 29, 2003; and Sep. 29, 2003, respectively, the entire contents of which are hereby incorporated by reference.

BACKGROUND OF THE INVENTION

1) Field of the Invention

The present invention relates to a driving force distribution and controlling apparatus for a vehicle and a driving force distribution and controlling method for a vehicle.

2) Description of the Related Art

Conventionally, for driving wheels of a general automobile, a differential gear is provided between the left wheel and the right wheel, and the different gear absorbs a difference in rotational speed between the left and right wheels upon turning so that it can perform turning smoothly. Further, in a four-wheel driven car, not only a differential gear for the left and right wheels but also another differential gear (center diff) for the front and rear wheels is provided in order that a difference in rotational speed between the front and rear wheels can be absorbed.

However, such conventional differential gears as described above have a characteristic that, when one of the driving wheels on one side from between the left and right wheels or between the front and rear wheels slips, driving force is not distributed to the driving wheel or wheels on the other side. Therefore, in recent years, a differential operation limiting apparatus for limiting the differential operation by a differential gear is frequently provided particularly in vehicle models designed for driving on a bad road, vehicle models designed for sports driving and so forth. As a representative example of a differential operation limiting apparatus, for example, an LSD (Limited Slip Difference: differential operation limiting apparatus) is available. By controlling the LSD electrically or mechanically, even if any driving wheel slips, driving force can be suitably distributed to suitable driving wheels.

Further, in recent years, a driving force distribution system (or a driving force distribution mechanism) has been implemented which not only operates when a driving wheel slips but also causes a driving system equipment as represented by an LSD described hereinabove to actively operate in accordance with a traveling situation of the vehicle to improve the turning performance, acceleration performance, stabilization performance and so forth of the vehicle. It is to be noted that, as particular examples included in the concept of the driving force distribution system, an electronically controlled LSD, a front-rear wheel driving force distribution mechanism capable of changing the distribution of driving force to front and rear wheels, a left-right wheel driving force distribution mechanism capable of changing the distribution of driving force to left and right wheels, and an electronically controlled coupling are available.

On the other hand, in recent years, a vehicle is equipped with an ABS (antilock brake system or antiskid brake system) so that, upon braking, the vehicle can be slowed down with certainty while the steering performance is assured.

However, in a vehicle which is equipped with both of the driving force distribution system and the ABS described above, interference sometimes occurs between control by the driving force distribution mechanism and control by the ABS.

Thus, a technique for eliminating such a trouble as just described to improve the control affinity between the driving force distribution system and the ABS has been proposed by the assignee of the present patent application (refer to Japanese Patent Laid-Open No. 2002-96651). According to the technique, the control condition of the driving force distribution system can be suitably changed over between a standard mode and another control mode (ABS-active mode) in which an effect by ABS control is not disturbed depending upon whether the ABS operates or does not operate.

However, according to the technique described above (refer to Japanese Patent Laid-Open No. 2002-96651), when the driving force distribution system is in the ABS-active mode in this manner, an effect by the driving force distribution system which has been available before the ABS is rendered operative sometimes drops.

Further, where the road friction p is high, since the difference between the effect by the standard mode and the effect by the ABS-active mode is great, for example, if the control condition of the driving force distribution system is changed over from the standard mode to the ABS-active mode (or reversely from the ABS-active mode to the standard mode) while the vehicle is traveling on a high-p road such as, for example, a dry asphalt road, then a shock arising from the mode changeover is generated, and there is the possibility that an unfamiliar feeling to the driving may be provided to the driver.

Therefore, it is demanded for a vehicle which is equipped with both of a driving force distribution mechanism and an ABS apparatus that, even if the ABS is rendered operative, the behavior of the vehicle can be stabilized while the turning performance, acceleration performance, stabilization performance and so forth are improved by the driving force distribution mechanism.

On the other hand, if such a failure occurs that a signal line for interconnecting a controller of the driving force distribution system or a controller of the ABS is disconnected or short-circuited, then there is the possibility that such a situation may occur that, although the ABS is operating, the driving force distribution system may operate in the standard mode. In such an instance, there is the possibility that the control by the driving force distribution system may disturb the effect by the ABS. Further, if the failure described above gives rise to a wrong decision of the driving force distribution system that the ABS is operating although the ABS is not actually operating, then the driving force distribution cannot be performed correctly.

SUMMARY OF THE INVENTION

It is an object of the present invention to provide a driving force distribution and controlling apparatus for a vehicle and a driving force distribution and controlling method for a vehicle by which control interference which may occur between control by a driving force distribution mechanism and control by an antiskid brake system is suppressed while the behavior of the vehicle is stabilized.

It is another object of the present invention to provide a driving force distribution and controlling apparatus for a vehicle and a driving force distribution and controlling method for a vehicle by which an operation state of an antiskid brake system can be decided with a high degree of accuracy.

It is a further object of the present invention to provide a driving force distribution and controlling apparatus for a vehicle and a driving force distribution and controlling method for a vehicle by which the control mode of a driving force distribution mechanism can be changed over appropriately in response to an operation state of an antiskid brake system.

In order to attain the objects described above, according to the present invention, there is provided a driving force distribution and controlling apparatus for a vehicle for controlling driving force to be transmitted from an engine to wheels, comprising a driving force distribution mechanism for variably transmitting the driving force from the engine to the wheels, a braking force controlling element for controlling braking force to the wheels in response to a slip state between the wheels and a road, a road friction estimation element for estimating a road friction of the road, and a driving force distribution controlling element for controlling, in order to adjust the driving force to be transmitted to the wheels, operation of said driving force distribution mechanism in response to a traveling state of the vehicle and for changing a control condition of said driving force distribution mechanism in accordance with the road friction estimated by said road friction estimation element while said braking force controlling element operates.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 3 is a table illustrating control of the vehicle driving force distribution and controlling apparatus and a vehicle driving force distribution and controlling method according to the first embodiment of the present invention;

FIG. 4 is a table illustrating control of a vehicle driving force distribution and controlling apparatus and a vehicle driving force distribution and controlling method according to a modification to the first embodiment of the present invention;

FIG. 6 is a table illustrating control of the vehicle driving force distribution and controlling apparatus and a vehicle driving force distribution and controlling method according to the second embodiment of the present invention;

DETAILED DESCRIPTION OF THE INVENTION

In the following, control of a vehicle driving force distribution and controlling apparatus and a vehicle driving force distribution and controlling method according to a first embodiment of the present invention are described with reference to FIGS. 1 to 3.

First, the driving force distribution and controlling apparatus according to the first embodiment of the present invention is described with reference to FIGS. 1 to 3. FIG. 1 is a schematic block diagram showing a configuration of the driving force distribution and controlling apparatus; FIG. 2 is a schematic block diagram showing a configuration of essential part of the driving force distribution and controlling apparatus; and FIG. 3 is a table illustrating a control condition of the driving force distribution and controlling apparatus and a vehicle driving force distribution and controlling method.

Figure 1:
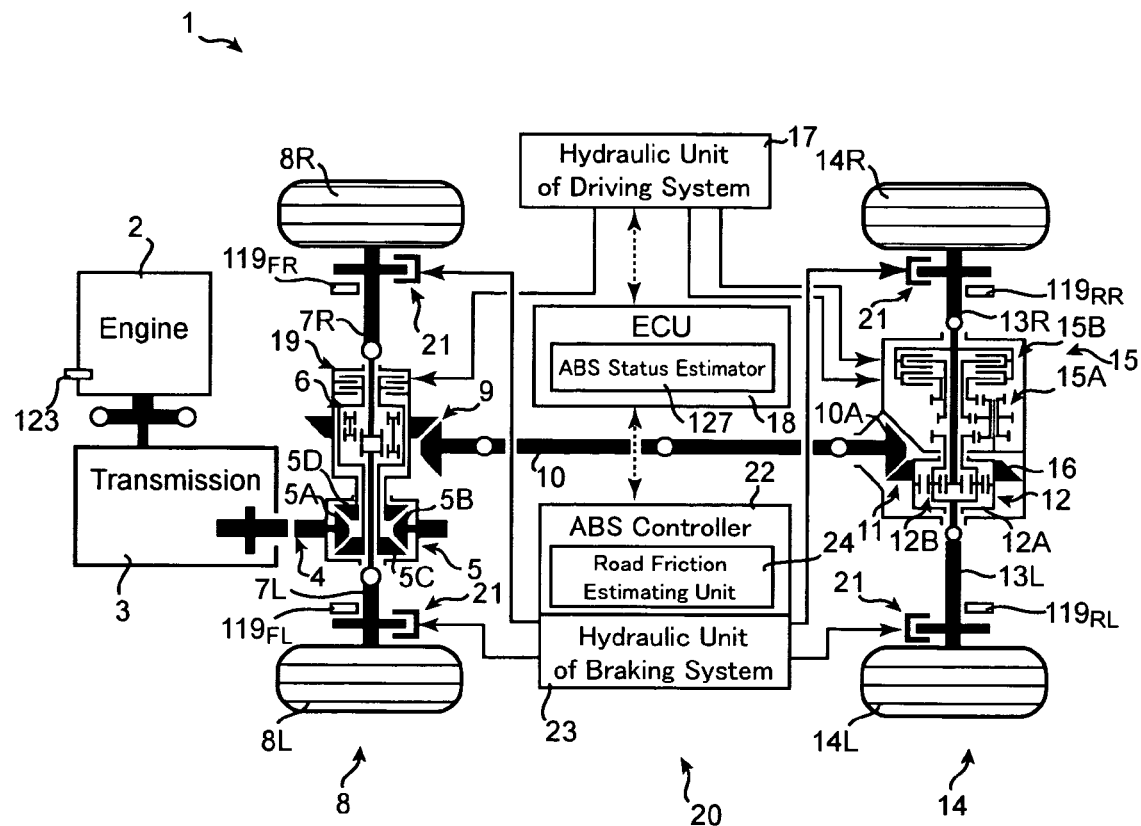
FIG. 1 is a schematic block diagram showing a configuration of a vehicle driving force distribution and controlling apparatus according to first and second embodiments of the present invention.

As shown in FIG. 1, a four-wheel drive vehicle 1, which is applied the driving force distribution and controlling apparatus of the present invention, includes an engine 2, a transmission 3 and so forth, and output power of the engine 2 is transmitted to a center differential (hereinafter referred to as center diff) 5 through the transmission 3 and an intermediate gear mechanism 4.

Further, output power of the center diff 5 is transmitted on one hand to axles 7L and 7R and further to left and right wheels 8L and 8R, which are front wheels 8, through a front differential (hereinafter referred to as front diff) 6 for the front wheels 8. Output power of the center diff 5 is transmitted on the other hand to axles 13L and 13R and further to left and right wheels 14L and 14R, which are rear wheels 14, through a hypoid gear mechanism 9, a propeller shaft 10, a hypoid gear mechanism 11 on the rear wheels side and a rear differential (hereinafter referred to as rear diff) 12. Further, a left-right wheel driving force distribution mechanism (driving force distribution mechanism) 15 whose details are hereinafter described is provided in the rear diff 12.

Further, the vehicle 1 includes a hydraulic unit 17 of driving system (hereinafter referred to as driving system hydraulic unit 17) for supplying pressure oil to the left-right wheel driving force distribution mechanism 15 and a front-rear wheel driving force distribution mechanism (driving force distribution mechanism) 19 hereinafter described, and a driving force distribution controller (ECU; driving force distribution and controlling element) 18 for controlling the driving system hydraulic unit 17 to control the operation state of the left-right wheel driving force distribution mechanism 15 and the front-rear wheel driving force distribution mechanism 19.

The center diff 5 includes differential pinions 5A and 5B and side gears 5C and 5D individually held in meshing engagement with the differential pinions 5A and 5B. Torque inputted from the differential pinions 5A and 5B is transmitted to the front wheels 8 through the side gear 5C, and is transmitted from the other side gear 5D to the rear wheels 14 through the propeller shaft 10 and so forth. Further, at this time, differential operation between the front wheels 8 and the rear wheels 14 is permitted by the center diff 5 so that the turning round performance of the vehicle 1 is not obstructed.

The front-rear wheel driving force distribution mechanism 19 capable of variably limiting the differential operation permitted between the front wheels 8 and the rear wheels 14 and variably distributing the torque outputted from the engine 2 to the front wheels 8 and the rear wheels 14 is connected to the center diff 5. The front-rear wheel driving force distribution mechanism 19 is formed from a wet-type hydraulic multiple disc clutch mechanism, and can suitably change the distribution of the torque (driving force) to be transmitted to the front wheels 8 and the rear wheels 14 in accordance with a hydraulic pressure supplied from the driving system hydraulic unit 17.

In particular, where the front-rear wheel driving force distribution mechanism 19 is used, it is possible, for example, to limit the differential operation between the front wheels 8 and the rear wheels 14 to improve the traction performance of the vehicle 1, and on the other hand, to permit the differential operation between the front wheels 8 and the rear wheels 14 to improve the turning round performance of the vehicle 1.

Further, a torque-responsive-type differential gear for mechanically limiting differential operation between the left and right wheels 8R and 8L in response to the magnitude of the torque inputted from the engine 2 is applied to the front diff 6.

It is to be noted that the hydraulic unit of the driving system 17 includes an accumulator, a motor pump for pressurizing working fluid in the accumulator to a predetermined pressure, and a pressure sensor for monitoring the hydraulic pressure of the oil pressurized by the motor pump, which are all not shown. The driving system hydraulic unit 17 further includes a solenoid controlled valve for further adjusting the hydraulic pressure of the pressure oil in the accumulator, whose pressure has been adjusted by the motor pump and outputting the pressure oil of the adjusted hydraulic pressure, and a directional control valve for changing over the destination of supply of the pressure oil adjusted by the solenoid controlled valve between predetermined oil chambers (not shown) in the left-right wheel driving force distribution mechanism 17.

Further, the ECU 18 for controlling the driving system hydraulic unit 17 includes a CPU, a ROM, a RAM, an interface and so forth which are all not shown, and sensors such as wheel rotational speed sensors, a steering angle sensor, a forward-backward G sensor, a lateral G sensor and a throttle position sensor which are all not shown are connected to the ECU 18. The ECU 18 controls the driving system hydraulic unit 17 in response to driving conditions of the vehicle, that is, the vehicle speed, the steering state, the traveling state and so forth of the vehicle body based on information detected by the various sensors.

Further, the ECU 18 has a built-in ABS status estimator (braking state estimation element) 127 whose details are hereinafter described so that it can be estimated whether or not an ABS 20 is operating. It is to be noted that, while the ABS status estimator 127 is implemented by software, it may otherwise be implemented by an electrical circuit or the like.

Now, a driving system for the rear wheels 14 side is described. The rear diff 12 for permitting a differential operation between the left and right wheels 14L and 14R is provided for the rear wheels 14. Also, the left-right wheel driving force distribution mechanism 15 capable of suitably changing the distribution of driving force to be transmitted to the left and right wheels 14L and 14R is provided for the rear wheels 14.

Further, a crown gear 16 held in meshing engagement with a pinion gear 10A at an end of the propeller shaft 10 on the rear wheel side is provided on an outer periphery of a case 12A of the rear diff 12. Further, a planet gear mechanism 12B is provided on the inner side of the case 12A. The differential operation between the left and right rear wheels 14L and 14R is permitted by the planet gear mechanism 12B. By such a configuration as just described, torque inputted from the engine 2 to the crown gear 16 through the propeller shaft 10, the pinion gear 10A and so forth is transmitted to the rear wheels 14L and 14R while the differential operation between the left rear wheel 14L and the right rear wheel 14R is permitted by the planet gear mechanism 12B.

Further, the left-right driving force distribution mechanism 15 includes a speed change mechanism 15A and a transmission capacity variable control type torque transmission mechanism 15B, and can suitably change the driving force (that is, torque) for the right wheel 14R and the left wheel 14L in response to a traveling situation of the vehicle and so forth in accordance with an instruction issued from the ECU 18.

The speed change mechanism 15A increases or decreases the rotational speed of one wheel (here, the left wheel 14L) from between the left and right wheels and outputs the increased or decreased rotational speed to the torque transmission mechanism 15B.

The transmission capacity variable control type torque transmission mechanism 15B is a wet-type hydraulic multiple disc clutch mechanism capable of adjusting the transmission torque capacity in response to control pressure oil supplied from the driving system hydraulic unit 17 controlled by the ECU 18. The torque transmission mechanism 15B utilizes a rotational speed difference between the rotational speed increased or decreased by the speed change mechanism 15A and the rotational speed of the other wheel (here, the right wheel 14R) from between the left and right wheels to perform transmission and reception of the torque between the left and right wheels 14L and 14R. Consequently, the driving torque of one wheel can be increased or decreased, and the driving torque of the other wheel can be decreased or increased. It is to be noted that, since techniques regarding the planet gear mechanism 12B, speed change mechanism 15A and torque transmission mechanism 15B are known, detailed description regarding the structures of them is omitted herein.

Consequently, for example, when the vehicle 1 advances while turning in a rightward direction, predetermined pressure oil is inputted from the hydraulic unit of the driving system 17 to the left-right wheel driving force distribution mechanism 15 to decrease the distribution amount of the torque to be transmitted to the right rear wheel 14R and decrease the speed of the right rear wheel 14R. Further, at this time, the torque distribution amount to be transmitted to the left rear wheel 14L increases and the speed of the left rear wheel 14L increases. Consequently, a right-handed (clockwise) yaw moment can be generated on the vehicle 1 thereby to improve the turning round performance of the vehicle 1.

Similarly, when the vehicle 1 advances while turning in a leftward direction, the left-right wheel driving force distribution mechanism 15 receives predetermined pressure oil from the driving system hydraulic unit 17 to decrease the distribution amount of the torque to be transmitted to the left rear wheel 14L and decrease the speed of the left rear wheel 14L. Further, at this time, the torque distribution amount to be transmitted to the right rear wheel 14R increases and the speed of the right rear wheel 14R increases. Consequently, a left-handed (counterclockwise) yaw moment can be generated on the vehicle thereby to improve the turning round performance of the vehicle 1.

Incidentally, the vehicle 1 is equipped with an antiskid brake system (ABS) 20 such that the braked conditions of the wheels 8L, 8R, 14L, 14R of the vehicle 1 may be controlled independently of each other by the ABS 20 so that each of them may have a preferable slip state with respect to the road. The ABS 20 includes four brake systems 21 provided individually for the wheels 8L, 8R, 14L, 14R of the vehicle 1, an ABS controller (antiskid brake control unit) 22 for controlling the brake systems 21, and a hydraulic unit 23 of braking system (hereinafter referred to as braking system hydraulic unit 23) for supplying pressure oil in accordance with an instruction from the ABS controller 22 to the brake systems 21.

The braking system hydraulic unit 23 includes a motor pump for adjusting the brake hydraulic pressure, a solenoid-controlled valve and so forth and inputs pressure oil of a predetermined hydraulic pressure instructed by the ABS controller 22 to each of the four brake systems 21 provided individually for the four wheels 8L, 8R, 14L, 14R.

The ABS controller 22 includes a CPU, a ROM, a RAM, an interface and so forth not shown. Further, various sensors such as a forward-backward G sensor, a lateral G sensor and a brake pedal operation sensor (brake switch) not shown are connected to the ABS controller 22. The ABS controller 22 controls the braking system hydraulic unit 23 based on the information detected by the various sensors.

Wheel speed sensors $119_{FL}$, $119_{FR}$, $119_{RL}$, $119_{RR}$ are provided for the axles 7L, 7R, 13L, 13R of the wheels 8L, 8R, 14L, 14R of the vehicle 1, respectively, so that the rotation speeds of the wheels are transmitted to the ABS controller 22.

It is to be noted that, where there is no necessity to particularly distinguish the wheel speed sensors $119_{FL}$, $119_{FR}$, $119_{RL}$, $119_{RR}$ from one another, each of them is referred to as "wheel speed sensor 119".

Further, a throttle valve sensor 123 for detecting the opening of a throttle valve (not shown) is provided for the engine 2, and a result of the detection by the throttle valve sensor 123 is transmitted to the ABS controller 22 and the ECU 18.

Figure 2:
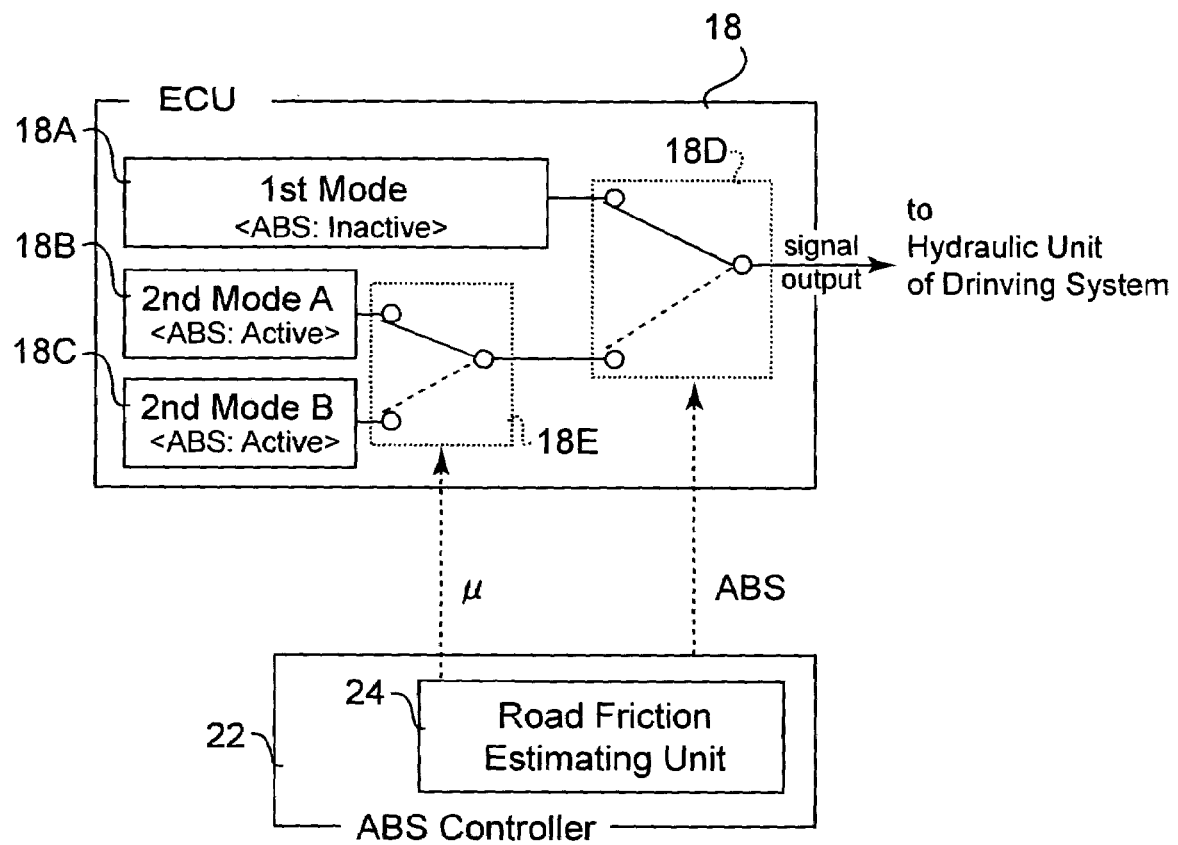
FIG. 2 is a block diagram schematically showing a configuration of essential part of the vehicle driving force distribution and controlling apparatus according to the first embodiment of the present invention.

FIG. 2 is a schematic block diagram showing a configuration of a control system of the present apparatus. Referring to FIG. 2, the ABS controller 22 includes a built-in road friction estimating unit (road friction estimation element) 24 such that the road friction μ of the road on which the vehicle 1 is traveling can be estimated by the road friction estimating unit 24. It is to be noted that the road friction estimating unit 24 is implemented by software stored in a memory (not shown) built in the ABS controller 22. Further, since various known techniques can be applied to the estimation method of the road friction μ, detailed description thereof is omitted herein.

The ECU 18 is electrically connected to the ABS controller 22 such that an operation state of the ABS 20 and the road friction μ estimated by the road friction estimating unit 24 are inputted to the ECU 18. Then, if the ABS 20 is rendered active, then the ECU 18 changes over the control condition (mode) of the driving force distribution mechanism (left-right wheel driving force distribution mechanism 15 and front-rear wheel driving force distribution mechanism 19) to a control condition (ABS-active mode) corresponding to the operation of the ABS 20. The ABS-active mode is set so that ABS control is prioritized and the influence which the driving force distribution has on the ABS control is reduced. Further, the control contents of the ABS-active mode can be changed in response to the road friction estimated by the road friction estimating unit 24.

Further, a first mode (standard mode) 18A which is executed while the ABS is inactive, that is, while the ABS is inactive, and in which the driving force distribution by the driving force distribution mechanisms 15, 19 is prioritized, a second mode A (ABS-active mode; second mode) 18B which is executed while the ABS 20 is active and the road friction p estimated by the road friction estimating unit 24 is equal to or higher than a predetermined value, and a second mode B (ABS-active mode; second mode) 18C which is executed while the ABS 20 is active and the road friction p estimated by the road friction estimating unit 24 is lower than the predetermined value are stored as available control modes of the driving force distribution mechanisms 15, 19 in the memory of the ECU 18. Thus, one of the first mode 18A, second mode A 18B and second mode B 18C is suitably selected in accordance with the operation state of the ABS 20 and the road friction μ.

Then, when the road friction p of the road estimated by the road friction estimating unit 24 is inputted to the ECU 18, the ECU 18 decides whether or not the road friction μ is lower than the predetermined threshold value. It is to be noted that the threshold value is set by a tyre performance test or the like.

More particularly, as seen in FIGS. 2 and 3, while the ABS 20 is inactive, the first mode 18A which is standard control is selected by a first selector 18D, but while the ABS 20 is active and the road friction μ of the road is high (that is, a high-μ road), the second mode A 18B is selected by the first selector 18D and a second selector 18E. While the ABS 20 is active and the road friction p of the road is low (that is, a low-μ road), the second mode B 18C is selected by the first selector 18D and the second selector 18E. It is to be noted that the high-μ road is a road which has a road friction equal to or higher than that which corresponds to a dry asphalt road, and the low-μ road is a road having a road friction lower than that which corresponds to a wet asphalt road.

Here, details of the modes 18A, 18B, 18C are described with reference to FIG. 3. The first mode 18A is a mode wherein both of the left-right wheel driving force distribution mechanism 15 and the front-rear wheel driving force distribution mechanism 19 as the driving force distribution mechanism are controlled based on driving force distribution prioritized control, and can cause the effect by driving force distribution to be exhibited to the utmost to obtain a high driving performance and a high turning performance.

The second mode A 18B is set as control wherein, as regards the front-rear wheel driving force distribution mechanism 19, operation of the ABS 20 is prioritized rather than the driving force distribution to the front and rear wheels, and as regards the left-right wheel driving force distribution mechanism 15, the driving force distribution between the left and right wheels is prioritized rather than the operation of the ABS 20. In other words, the second mode A 18B is a mode wherein the left-right wheel driving force distribution mechanism 15 is controlled by the driving force distribution prioritized control described hereinabove, that is, the driving force distribution control of the left-right wheel driving force distribution mechanism 15 carried out in the first mode 18A, and the front-rear wheel driving force distribution mechanism 19 is controlled by ABS prioritized control.

The ABS prioritized control is a control mode by which the effect by operation of the ABS 20 is obtained in a prioritized manner rather than the effect of the driving force distribution control by the driving force distribution mechanism. It is to be noted, however, that details of the driving force distribution prioritized control and the ABS prioritized control are disclosed in Japanese Patent Laid-Open No. 2002-96651 by the assignee of the present patent application, and therefore, detailed description of them is omitted herein. However, simple description of the ABS prioritized control is given here. The ABS prioritized control is a control mode wherein the driving force distribution mechanisms 15, 19 distribute driving force in response only to the rotation speed difference between at least wheels paired with each other, and can suppress control interference which may otherwise occur between control by the ABS 20 and control by the driving force distribution mechanisms 15, 19.

Accordingly, according to the second mode A 18B, the turning performance of the vehicle 1 is raised by the left-right wheel driving force distribution mechanism 15 while a stabilized braking effect by the ABS 20 can be obtained with certainty.

It is to be noted that the second mode A 18B is set such that, as the road friction μ estimated by the road friction estimating unit 24 increases, the priority degree (degree of affinity) of the operation of the ABS 20 decreases. Consequently, as the road friction p of the road increases, a higher effect by the driving force distribution mechanisms 15, 19, that is, a higher turning round performance and a high acceleration performance, can be obtained.

Also the second mode B 18C is set as a control mode wherein the operation of the ABS 20 is prioritized rather than the driving force distribution of both of the front-rear wheel driving force distribution mechanism 19 and the left-right wheel driving force distribution mechanism 15. In particular, the second mode B 18C is a control mode wherein both of the left-right wheel driving force distribution mechanism 15 and the front-rear wheel driving force distribution mechanism 19 are controlled by the ABS prioritized control. Accordingly, according to the second mode B 18C, a braking effect by the ABS 20 can be obtained to the utmost.

It is to be noted that the second mode B 18C is set such that, as the road friction p estimated by the road friction estimating unit 24 increases, the degree of priority (degree of affinity) of the operation of the ABS 20 decreases. Consequently, as the road friction μ of the road increases, a higher effect by the driving force distribution by the driving force distribution mechanisms 15, 19, that is, a higher turning round performance and a higher acceleration performance, can be obtained.

The modes 18A, 18B, 18C are recorded in the memory not shown built in the ECU 18, and the first and second selectors 18D, 18E are implemented by software or an electric circuit.

It is to be noted that the reason why such control as described above can be performed in the present invention is that it has become apparent to the inventors of the present invention that, even if the ABS 20 is active and besides the front-rear wheel driving force distribution mechanism 19 or the left-right wheel driving force distribution mechanism 15 operates, where the road μ is high, control interference which occurs between the ABS 20 and the front-rear wheel driving force distribution mechanism 19 and left-right wheel driving force distribution mechanism 15 is small and consequently the influence which the driving force distribution control has on the effect of control by the ABS 20 is small.

The driving force distribution an,d controlling apparatus for a vehicle according to the first embodiment of the present invention is configured in such a manner as described above, and operation and effects of the driving force distribution and controlling apparatus for a vehicle and the driving force distribution and controlling method for a vehicle are described below.

First, where the ABS 20 is inactive while the vehicle 1 is traveling, the first selector 18D of the ECU 18 selects the first mode 18A irrespective of whether the road friction p during traveling estimated by the road friction estimating unit 24 is high or low. Thus, the left-right wheel driving force distribution mechanism 15 and the front-rear wheel driving force distribution mechanism 19 are controlled in accordance with the thus selected first mode 18A, and the acceleration performance and the turning round property of the vehicle 1 are improved.

On the other hand, while the ABS 20 is active, the first selector 18D selects the second selector 18E. Further, at this time, the road friction μ of the road estimated by the road friction estimating unit 24 is compared with the predetermined threshold value. If the estimated road friction p is equal to or higher than the threshold value, then the second selector 18E selects the second mode A 18B. Consequently, the left-right wheel driving force distribution mechanism 15 is controlled by the driving force distribution prioritized control while the front-rear wheel driving force distribution mechanism 19 is controlled by the ABS prioritized control, and while the turning round performance of the vehicle 1 is raised, a reliable braking effect by the ABS 20 can be obtained.

Further, where the ABS 20 is active and the road friction p received by the ECU 18 is lower than the predetermined threshold value, the second mode B 18C is selected. Consequently, the braking control by the ABS 20 is prioritized rather than the driving force distribution by the driving force distribution mechanism, that is, the left-right wheel driving force distribution mechanism 15 and the front-rear wheel driving force distribution mechanism 19, and a high braking performance can be obtained.

It is to be noted that the case wherein the control by the ABS 20 is prioritized most (that is, while the second mode B 18C is being executed) is, in other words, a case wherein the vehicle 1 is traveling on a low-μ road, and it has been made apparent by the inventors of the invention of the present patent application that, where the vehicle 1 is traveling on such a low-μ road, the stability of the vehicle is improved by the braking control by the ABS 20. Accordingly, if the second mode B 18C is executed while the vehicle 1 is traveling on a low-μ road, then although the braking control by the ABS 20 is prioritized rather than the vehicle behavior control by the driving force distribution mechanism (left-right wheel driving force distribution mechanism 15 and front-rear wheel driving force distribution mechanism 19), actually the traveling stability of the vehicle 1 can be raised by the operation of the ABS 20, and there is no possibility that the behavior of the vehicle may be rendered unstable.

In this manner, in the embodiment described above, the driving force distribution mechanism is controlled by the control condition of the standard mode while the ABS 20 is inactive, but is controlled by the control condition of the ABS-active mode corresponding to the operation of the ABS 20 when the ABS 20 is active.

Then, in the ABS-active mode, where the road friction p is equal to or higher than the predetermined threshold value (a high-μ road), the front-rear wheel driving force distribution mechanism 19 is controlled based on the ABS prioritized control while the left-right wheel driving force distribution mechanism 15 is controlled based on the driving force distribution prioritized control. On the other hand, where the road friction μ d is lower than the predetermined threshold value (a low-μ road), the front-rear wheel driving force distribution mechanism 19 and the left-right wheel driving force distribution mechanism 15 are both controlled based on the ABS prioritized control.

Consequently, in the ABS-active mode which is carried out while the ABS 20 is active, the control condition is set such that, when the road friction is equal to or higher than the predetermined value, the degrees of affinity, which corresponds to the operation of the ABS 20, are lower than those when the road friction is lower than the predetermined value.

On the other hand, where the ABS 20 is active and the vehicle 1 is traveling on a high-μ road, the control condition of the front-rear wheel driving force distribution mechanism 19 is set to the ABS prioritized control and the control condition of the left-right wheel driving force distribution mechanism 15 is set to the driving force distribution prioritized control. Consequently, the degrees of affinity, which corresponds to the operation of the ABS 20 in the driving force distribution control of the front-rear wheel driving force distribution mechanism 19, are set higher than the degrees of affinity, which corresponds to the operation of the ABS 20 in the driving force distribution control of the left-right wheel driving force distribution mechanism 15.

It is to be noted that, while, in the embodiment described above, in the ABS-active mode carried out when the ABS 20 is active, only the driving force distribution control of the front-rear wheel driving force distribution mechanism 19 is set to the ABS prioritized control where the road is a high-μ road, there is no necessity to limit the ABS-active mode to the configuration described above, and the ABS-active mode may otherwise be set such that the driving force distribution control of both of the front-rear wheel driving force distribution mechanism 19 and the left-right wheel driving force distribution mechanism 15 is set as the ABS-active control irrespective of the road friction p and the ABS-active control is set such that, as the road friction increases, the degrees of affinity, which corresponds to the operation of the ABS 20, decrease.

Further, in the embodiment described above, while the ABS 20 is inactive, the first mode 18A is selected by the first selector 18D, but while the ABS 20 is active, the second selector 18E is selected by the first selector 18D, and where the road friction μ is low (a low-μ road), the second mode A 18B is selected by the second selector 18E. However, there is no necessity to limit the selectors to the configuration just described, but the selectors may be configured otherwise such that the first mode 18A and the second mode A 18B can be selected only by means of a single selector and this selector selects the second mode A 18B when a signal representing that the ABS 20 is active and the road is a low-μ road is received from the ABS controller 22.

Now, a driving force distribution and controlling apparatus for a vehicle and a driving force distribution and controlling method for a vehicle according to a modification to the first embodiment of the present invention are described with reference to FIG. 4.

The present modification is different from the embodiment described above only in the control conditions of the driving force distribution mechanisms 15, 19 but is similar in the other configuration, and therefore, only the control conditions illustrated in FIG. 4 are described.

An operation state of the ABS 20 and a road friction p estimated by the road friction estimating unit 24 are inputted to the ECU 18 so that the control condition (mode) of the driving force distribution mechanism (left-right wheel driving force distribution mechanism 15 and the front-rear wheel driving force distribution mechanism 19) is changed over in response to the operation state of the ABS 20 and the road friction μ.

Then, while the ABS 20 is inactive, the ECU 18 selects the standard mode wherein the driving force distribution by the driving force distribution mechanisms 15, 19 is prioritized as the control mode for the driving force distribution mechanisms 15, 19.

The standard mode includes a plurality of control conditions such as "rotation speed difference control (ΔN control)" which is based on the rotation speed difference between different ones of the wheels, that is, between the front and rear wheels 8 and 14 and between the left and right wheels 14L and 14R, "acceleration control" which is based on the throttle opening or the steering angle for preventing an initial slip of a wheel upon sudden starting or for improving the responsibility of the vehicle upon turning, and "slowdown control" which is based on a forward-backward acceleration for assuring the stability of the posture of the vehicle upon sudden slowdown. Then, the driving force distribution mechanisms 15, 19 are controlled based on final control values determined by summing different control values obtained depending upon the plurality of control contents. It is to be noted that the control contents in the standard mode described are similar to those of the technique disclosed in Japanese Patent Laid-Open No. 2002-96651, and therefore, detailed description of them is omitted herein.

Further, while the ABS 20 is active, the ECU 18 changes the control mode of the driving force distribution mechanisms 15, 19 to the ABS-active mode which is a control mode corresponding to the operation of the ABS 20. The ABS-active mode is set such that the ABS control is prioritized and the influence which the driving force distribution control has on the ABS control is reduced. Then, in the ABS-active mode, where the road friction μ estimated by the road friction estimating unit 24 is equal to or higher than a predetermined threshold value (a high-μ road), high-μ-and-ABS-active control is carried out, but where the road friction p is lower than the predetermined threshold value (a low-μ road), low-μ-and-ABS-active control is carried out.

Particularly, in the high-p-and-ABS-active control, the driving force distribution mechanisms 15, 19 are controlled based on final control amounts determined by summing the control amounts by the ΔN control, acceleration control and slowdown control similarly as in the standard control in the standard mode. However, in the high-μ-and-ABS-active control, the control amount in the ΔN control is set to a value reduced from the control value in the ΔN control in the standard mode by gain adjustment or the like.

In the low-ρ-and-ABS-active control, the driving force distribution mechanisms 15, 19 are controlled based on the control amount only in the ΔN control in the standard control in the standard mode. However, the control amount in the ΔN control in the low-μ-and-ABS-active control is set to a value reduced from the control value in the ΔN control in the high-μ-and-ABS-active control by gain adjustment of the like.

In this manner, according to the driving force distribution and controlling apparatus of the present modification, the driving force distribution control is executed in response to the rotation speed difference ΔN at least between the front and rear wheels 8 and 14 or between the left and right wheels 14L and 14R of the vehicle 1, and in the ABS-active mode while the ABS 20 is active, the control amount based on the rotation speed difference ΔN is set so as to be lower than the control amount based on the rotation speed difference ΔN in the standard control when the ABS is inactive. Consequently, while the turning round performance of the vehicle 1 is improved, a reliable braking effect by the ABS 20 can be achieved.

Particularly, in the ABS-active mode when the ABS 20 is active, where the road friction µ is high (a high-µ road), the driving force distribution mechanisms 15, 19 are controlled based on the control amounts from between which only the control amount for the ΔN control is reduced from that in the standard control to obtain effects by the driving force distribution by the driving force distribution mechanisms 15, 19, that is, a high turning round performance and a high acceleration performance.

On the other hand, where the road friction µ is low (a low-µ road), the driving force distribution mechanisms 15, 19 are controlled only based on the ΔN control and the control amount in the ΔN control is set to a value reduced from the control amount in the ΔN control in the high-µ-and-ABS-active control so that the braking control by the ABS 20 is prioritized rather than the driving force distribution by the driving force distribution mechanisms 15, 19. Consequently, a high braking performance can be obtained.

In other words, in the ABS-active mode when the ABS is operative, the control contents of the driving force distribution mechanisms 15, 19 are changed and the control amount in the ΔN control is changed in response to the road friction so that, as the road friction increases, the degrees of affinity, which corresponds to the operation of the ABS 20, decrease.

It is to be noted that the control amounts in the high-µ-and-ABS-active control and the low-µ-and-ABS-active control in the ABS-active mode can be set in response to the road friction otherwise such that they increase as the road friction µ increases (a high-µroad).

Further, the control condition of only one of the left-right wheel driving force distribution mechanism 15 and the front-rear wheel driving force distribution mechanism 19 is changed over between the high-µ-and-ABS-active control and the low-µ-and-ABS-active control in response to the road friction.

It is to be noted that the present invention is not limited to the embodiment and the modification to the embodiment described hereinabove, but can be carried out in various modified forms without departing from the spirit and scope of the present invention.

For example, while, in the embodiment described above, the driving force distribution mechanism is applied to the front-rear wheel driving force distribution mechanism and the left-right wheel driving force distribution mechanism, any other mechanism (for example, an electronically controlled LSD or an electronically controlled coupling) may be applied as the driving force distribution mechanism only if it can change the driving force to be transmitted to different wheels from an engine.

Further, while, in the embodiment described above, the road friction estimating unit 24 is built in the ABS controller 22, the configuration of the road friction estimating unit 24 is not limited to this, but the road friction estimating unit 24 may otherwise be provided separately from the ABS controller 22 or may alternatively be provided in the inside of the ECU 18.

Figure 5:
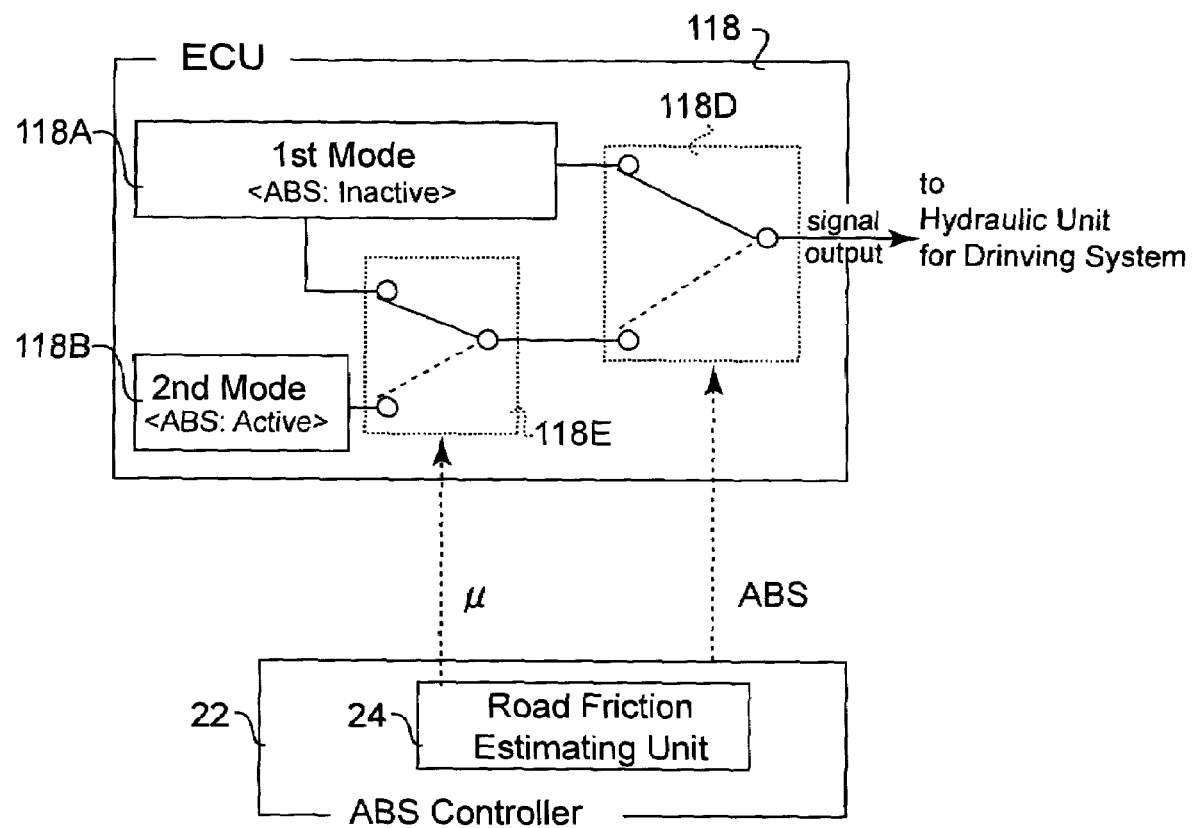
FIG. 5 is a block diagram schematically showing a configuration of essential part of a vehicle driving force distribution and controlling apparatus according to the second embodiment of the present invention.

Now, a driving force distribution and controlling apparatus for a vehicle and a driving force distribution and controlling method for a vehicle according to a second embodiment of the present invention are described with reference to FIGS. 5 and 6. It is to be noted that the second embodiment has a configuration similar to that of the first embodiment described hereinabove except that, in the present second embodiment, the ECU 18 in the first embodiment described hereinabove with reference to FIG. 2 is replaced by an ECU 118 as seen in FIG. 5. Thus, the following description is given principally of the difference of the second embodiment from the first embodiment.

As seen in FIG. 5, the road friction estimating unit 24 is built in the ABS controller 22 such that the road friction µ of the road on which the vehicle 1 is traveling can be estimated by the road friction estimating unit 24. It is to be noted that the road friction estimating unit 24 is implemented by software stored in a memory (not shown) built in the ABS controller 22. Further, since various known techniques can be applied to the estimation technique of the road friction µ, detailed description of the technique is omitted herein.

The ECU 118 is electrically connected to the ABS controller 22 such that, while the ABS 20 is active, an ABS operation signal representative of an operation state of the ABS 20 and the road friction µ estimated by the road friction estimating unit 24 are inputted from the ABS controller 22 to the ECU 118. When the ABS 20 is active, the ECU 118 can change the control condition (mode) of the driving force distribution mechanism (left-right wheel driving force distribution mechanism 15 and front-rear wheel driving force distribution mechanism 19) in response to the road friction µ estimated by the road friction estimating unit 24. More particularly, when the road friction µ estimated by the road friction estimating unit 24 is inputted, the ECU 118 decides whether or not the road friction µ is lower than a predetermined threshold value. It is to be noted that the threshold value is set based on a result of a tyre performance test.

Further, as indicated by reference characters 118A and 118B in FIG. 5, as control conditions (modes) of the driving force distribution mechanisms 15, 19, a first mode 118A wherein the behavior control of the vehicle 1 by the driving force distribution mechanisms 15, 19 is prioritized rather than the operation of the ABS 20 (that is, the standard control in the ABS inactive state and a second mode 118B wherein the operation of the ABS 20 is prioritized (that is, an effect of the ABS control is not disturbed) are set. Thus, one of the modes 118A and 118B is selected by the ECU 18.

It is to be noted, however, that details of the first mode 118A and the second mode 118B described above are disclosed in Japanese Patent Laid-Open No. 2002-96651 by the assignee of the present patent application, and therefore, detailed description of them is omitted herein. However, simple description of the second mode 118B is given here. The second mode 118B is a control condition wherein the driving force distribution mechanisms 15, 19 distribute the driving force in response to a rotation speed difference at least between the front wheels 8 and the rear wheels 14 of the vehicle or between the left wheel 14L and the right wheel 14R.

When the ABS is inactive, a first selector 118D built in the ECU 118 selects the first mode 118A. On the other hand, while the ABS 20 is active, the first selector 118D cancels the selection of the ECU 118 but selects a second selector 118E built in the ECU 118. Then, the second selector 118E selects the second mode 118B or the first mode 118A in response to the magnitude of the road friction p estimated by the road friction estimating unit 24 built in the ABS controller 22.

In particular, as seen from FIG. 6, when the ABS is inactive, the first mode 118A which is the standard control is selected, but when the ABS 20 is active and besides the road friction µ is high (that is, the road is a high-µ road), the first mode 118A is selected similarly. However, when the ABS 20 is active and besides the road friction µ is low (that is, the road is a low-µ road), the second mode 118B (ABS prioritized mode) is selected. It is to be noted that the high-µ road is a road whose road friction µ is equal to or higher than a road friction which corresponds to that of, for example, a dry asphalt road, and the low-μ road is a road whose road friction μ is lower than a road friction which corresponds to that of a wet asphalt road.

It is to be noted that, in the present embodiment, the modes 118A and 118B are recorded in the memory not shown built in the ECU 118, and the first and second selectors 118D, 118E are implemented by software or an electric circuit.

Here, differences between the conventional control technique and the control technique of the present embodiment are described with reference to FIG. 6.

In the conventional technique, when the ABS is inactive, a driving force distribution mechanism is controlled based on a standard mode which is a controlling condition corresponding to the first mode of the present invention, but while the ABS is active, the driving force distribution mechanism is controlled normally based on the ABS-active mode which is a controlling condition corresponding to the second mode of the present invention. In other words, when the ABS is active, the driving force distribution mechanism is controlled so that the braking control by the ABS is prioritized rather than the behavior control of the vehicle by the driving force distribution mechanism so that control interference between the ABS and the driving force distribution mechanism is eliminated.

In contrast, in the present embodiment according to the present invention, the control modes of the driving force distribution mechanism (left-right wheel driving force distribution mechanism 15 and front-rear wheel driving force distribution mechanism 19) are changed over not only in response to a control trigger provided by whether the ABS 20 is active or inactive but also in response to another control trigger provided by whether the road friction μ is high or low in addition to that when the ABS 20 is active.

In particular, even if the ABS 20 is active, if the road friction μ is high, then the driving force distribution mechanisms 15, 19 are controlled continuously based on the first mode 118A which is a control condition similar to that while the ABS is inactive. On the other hand, when the ABS 20 is active and the road friction μ is low, the driving force distribution mechanisms 15, 19 are controlled based on the second mode 118B wherein the control effect by the ABS 20 is prioritized rather than the control effect by the driving force distribution mechanisms 15, 19.

It is to be noted that the reason why such control as described above can be performed in the present invention is that it has become apparent to the inventors of the present invention that, even if the ABS 20 is active and besides the front-rear wheel driving force distribution mechanism 19 or the left-right wheel driving force distribution mechanism 15 is active, where the road μ is high, control interference which occurs between the ABS 20 and the front-rear wheel driving force distribution mechanism 19 or left-right wheel driving force distribution mechanism 15 is so small that the influence which the driving force distribution control has on the effect of control by the ABS 20 is small.

The driving force distribution and controlling apparatus according to the embodiment of the present invention is configured in such a manner as described above, and operation and effects of the driving force distribution and controlling apparatus are described below.

First, where the ABS 20 is inactive while the vehicle 1 is traveling, the first selector 118D of the ECU 118 selects the first mode 118A irrespective of whether the road friction during traveling estimated by the road friction estimating unit 24 is high or low. Thus, the left-right wheel driving force distribution mechanism 15 and the front-rear wheel driving force distribution mechanism 19 are controlled in accordance with the thus selected first mode 118A, and the acceleration performance and the turning round property of the vehicle 1 are improved.

On the other hand, while the ABS 20 is active, also the signal representative of the road friction μ estimated by the road friction estimating unit 24 is inputted to the ECU 118. Consequently, the first selector 118D selects the second selector 118E. Further, at this time, the road friction estimating unit 24 compares the received road friction μ and the predetermined threshold value with each other. If the road friction μ is equal to or higher than the threshold value, then the second selector 118E selects the first mode 118A. Consequently, similarly as in the case wherein the ABS is inactive, the left-right wheel driving force distribution mechanism 15 and the front-rear wheel driving force distribution mechanism 19 are both controlled by the first mode. Consequently, while the turning rout performance of the vehicle 1 is raised, a reliable braking effect by the ABS 20 can be obtained.

Further, where the ABS 20 is active and the road friction μ received by the ECU 118 is lower than the predetermined threshold value, the second mode 118B is selected. Consequently, the braking performance by the ABS 20 is prioritized rather than the behavior stability of the vehicle by the driving force distribution mechanism, that is, by the left-right wheel driving force distribution mechanism 15 and the front-rear wheel driving force distribution mechanism 19, and as a result, a high braking performance can be obtained.

It is to be noted that the case wherein the control by the ABS 20 is prioritized most (that is, while the second mode is being executed) is, in other words, a case wherein the vehicle 1 is traveling on a low-μ road, and it has been clarified by the inventors of the invention of the present patent application that, where the vehicle 1 is traveling on such a low-μ road, the stability of the vehicle is improved by the braking control by the ABS 20. Accordingly, if the second mode is executed while the vehicle 1 is traveling on a low-μ road, then although the braking control by the ABS 20 is prioritized rather than the vehicle behavior control by the driving force distribution mechanism (left-right wheel driving force distribution mechanism 15 and front-rear wheel driving force distribution mechanism 19), actually the traveling stability of the vehicle 1 can be raised by the operation of the ABS 20, and there is no possibility that the behavior of the vehicle may be rendered unstable.

It is to be noted that the present invention is not limited to the embodiment described hereinabove, but can be carried out in various modified forms without departing from the spirit and scope of the present invention.

For example, while, in the embodiment described above, the driving force distribution mechanism is applied to the front-rear wheel driving force distribution mechanism 19 and the left-right wheel driving force distribution mechanism 15, any other mechanism (for example, an electronically controlled LSD or an electronically controlled coupling) may be applied as the driving force distribution mechanism only if it can change the driving force to be transmitted to the different wheels from the engine.

Further, the driving force distribution mechanism may be formed from the front-rear wheel driving force distribution mechanism 19 which can change the driving force distribution between the front and rear wheels of the vehicle and the left-right wheel driving force distribution mechanism 15 which can change the driving force distribution between the left and right wheels of the vehicle such that, even when the ABS 20 is active, if the road friction estimated by the road friction estimating unit 24 is equal to or higher than the predetermined value, then the first mode (standard mode)

118A is selected as the operation mode of the left-right wheel driving force distribution mechanism 15 while the second mode 118B is selected as the operation mode of the front-rear wheel driving force distribution mechanism 19. Where the front-rear wheel driving force distribution mechanism 19 and the left-right wheel driving force distribution mechanism 15 are controlled simultaneously but independently of each other in response to the estimated road friction, appropriate driving force and an appropriate turning round performance can be obtained.

Further, while, in the present embodiment, the road friction estimating unit 24 is built in the ABS controller 22, the configuration of the road friction estimating unit 24 is not limited to this, but the road friction estimating unit 24 may otherwise be provided separately from the ABS controller 22 or may alternatively be provided in the inside of the ECU 18.

Further, in the present embodiment described above, when the ABS is inactive, the first mode 118A is selected by the first selector 118D, but while the ABS 20 is active, the second selector 118E is selected by the first selector 118D. Further, at this time, if the road friction μ is low (a low-μ road), then the second mode 118B is selected by the second selector 118E. However, the selectors are not limited to the configuration just described.

For example, the selectors may be configured otherwise such that the first mode 118A and the second mode 118B can be selected only by means of a single selector and this selector selects the second mode 118B when a signal representing that the ABS 20 is active and the road is a low-μ road is received from the ABS controller 22.

Now, an operation decision in control of the ABS driving force distribution and controlling apparatus for a vehicle and the driving force distribution and controlling methods for a vehicle according to the first and second embodiments of the present invention is described with reference to FIGS. 7 to 12. It is to be noted that, in the following description, that wheel from among the four wheels 8R, 8L, 14R, 14L of the vehicle 1 which rotates at the fourth highest speed (that is, the lowest wheel rotation speed) is referred to as "fourth speed wheel", and the wheel rotating at the third highest speed (that is, the second lowest wheel rotation speed) is referred to as "third speed wheel". Further, the speed of the fourth speed wheel is referred to as "fourth rotation speed" and the speed of rotation of the third speed wheel is referred to as "third rotation speed".

Further, the operation decision method of the ABS is described taking a case wherein the operation decision of the ABS 20 is performed when the left rear wheel 14L is the fourth rotation wheel as an example.

The ABS operation decision method principally includes a first step and a second step. The first step is a step which is hereinafter described at least as a step S14 illustrated in FIG. 12 while the second step includes a plurality of steps which are described as steps S15 (third step), S16 (fourth step) and S17 (fifth step).

First at step S11, the wheel rotation speeds of the wheels 8L, 8R, 14L, 14R are detected by the wheel speed sensors $119_{FL}$, $119_{FR}$, $119_{RL}$, $119_{RR}$ and transmitted to the ECU 18. Oscillation components (waveform) of the wheel rotation speed of the left rear wheel 14L obtained at step S11 are illustrated in FIG. 9A.

Figure 9A:
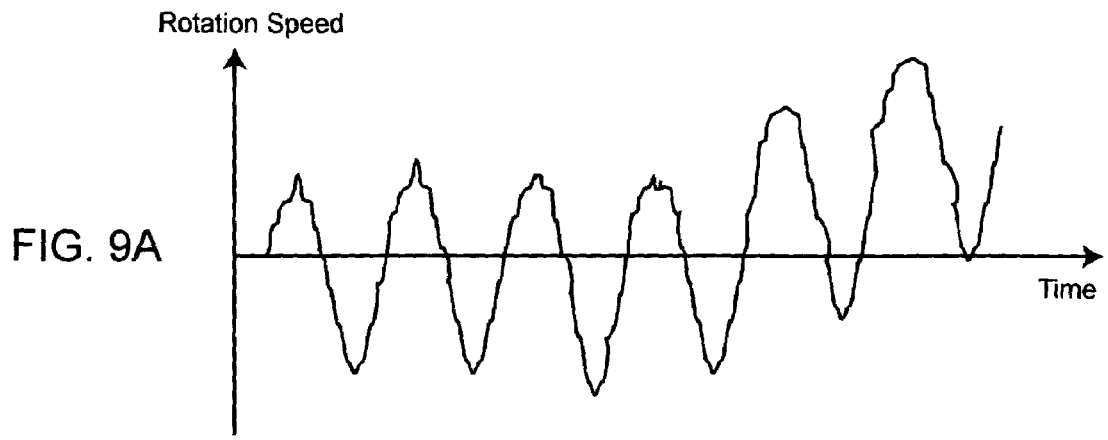
FIGS. 9A, 9B and 9C are diagrammatic views illustrating the operation decision of the ABS in the control of the vehicle driving force distribution and controlling apparatus and the vehicle driving force distribution and controlling method according to the first and second embodiment of the present invention.
Figure 9B:
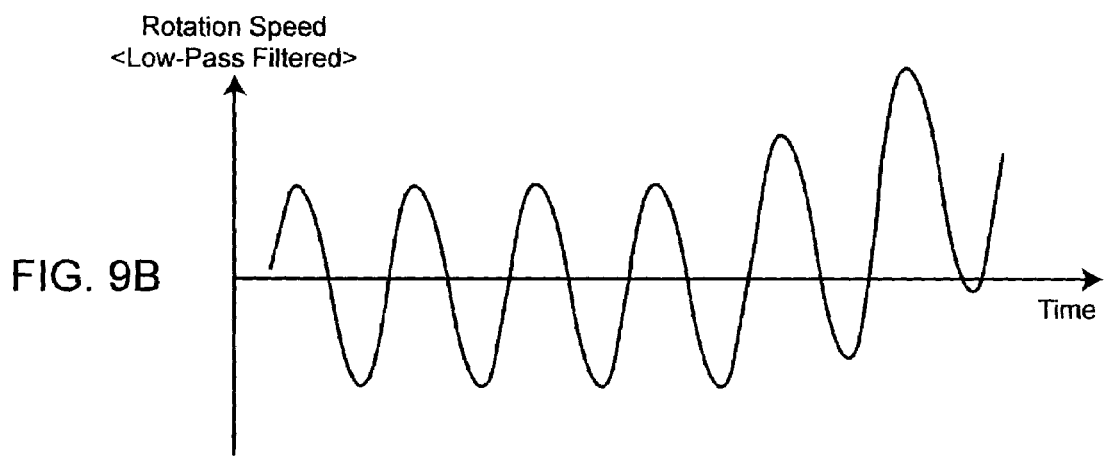

Incidentally, the data obtained from the wheel speed sensors $119_{FL}$, $119_{FR}$, $119_{RL}$, $119_{RR}$ include fine high frequency noise (predetermined high frequency components) as seen in FIG. 9A. Therefore, the ECU 18 performs a low-pass filter (LPF) process for the wheel speeds of the wheels 8L, 8R, 14L, 14R (refer to step S12 of FIG. 12). Oscillation components of the rotation speed of the left rear wheel 14L obtained by the low-pass filter process at step S12 are illustrated in FIG. 9B. The high frequency noise is removed by the low-pass filter process described above so that a smooth waveform is obtained.

Figure 7:
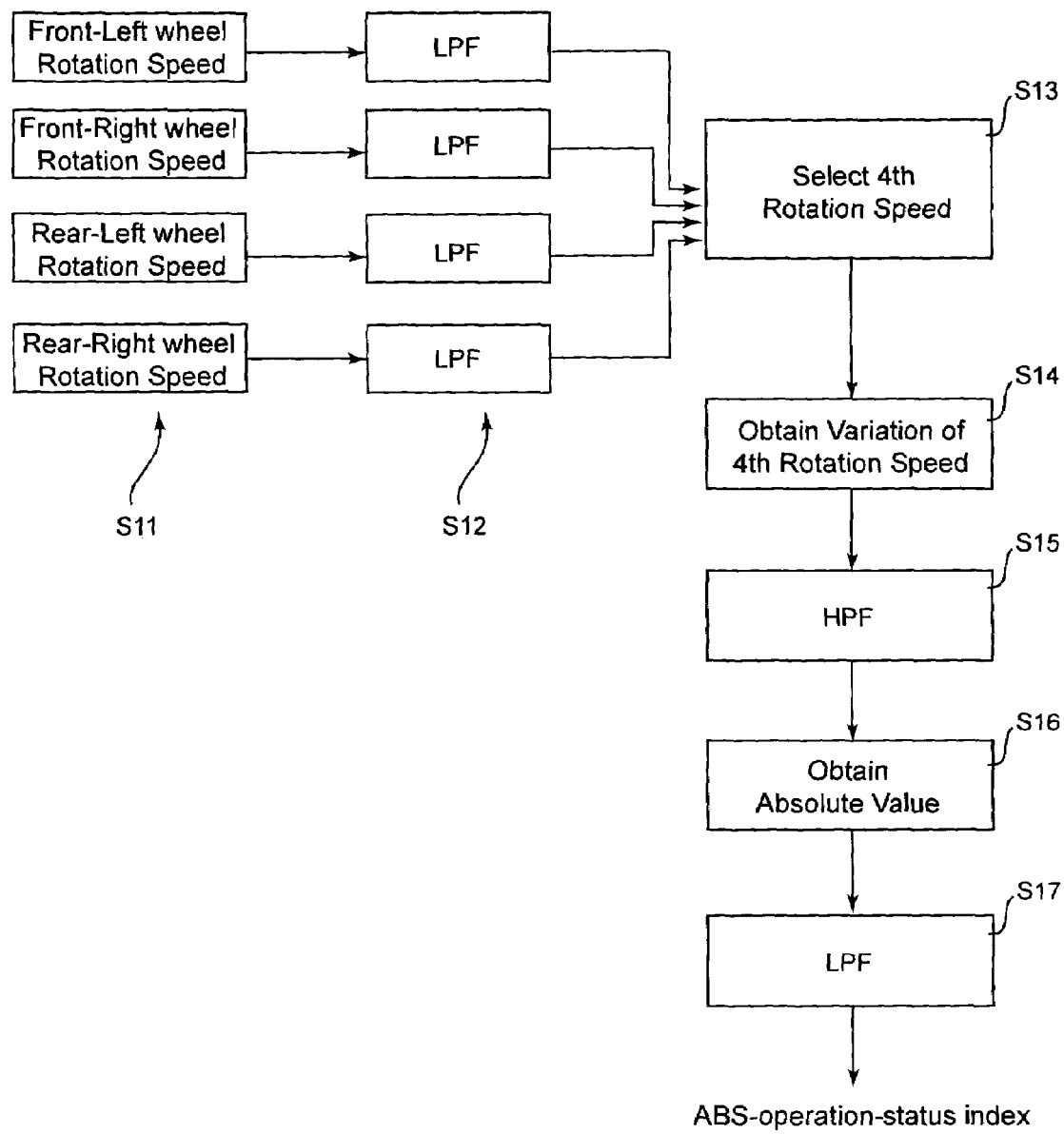
FIG. 7 is a flow diagram illustrating operation decision of an ABS in the control of the vehicle driving force distribution and controlling apparatus and the vehicle driving force distribution and controlling method according to the first and second embodiment of the present invention.

Thereafter, the fourth speed wheel which is a wheel rotating at the lowest speed is selected based on a result of the process at step S12 (refer to step S13 of FIG. 7). This is intended to securely select that one of the wheels 8L, 8R, 14L, 14R which is rotating slowest based on the oscillation components of the smoothed rotation speed obtained by removing high frequency noise at step S12 as described hereinabove with reference to FIG. 9B.

Further, the reason whey the forth wheel speed which is the rotation speed of the fourth speed wheel is that, since the rotation speed of a wheel on which the ABS 20 is active is inevitably made lower than the other wheels, the possibility that the wheel which is rotating slowest may be acted upon by the ABS 20 is the highest among the wheels.

Figure 9C:
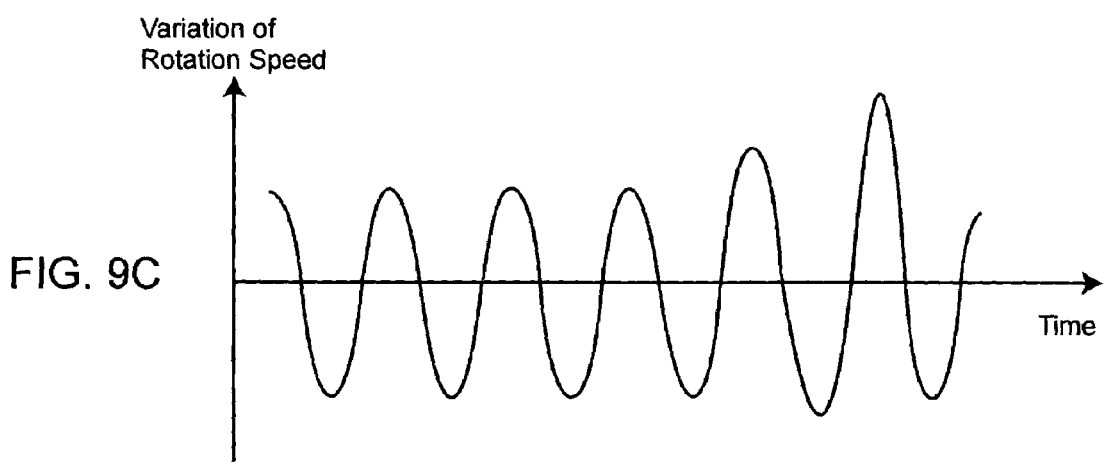

Then, a change rate arithmetic operation process which is a process of calculating a rate of change (oscillation components) of the wheel rotation speed per unit time is performed for the fourth wheel speed [refer to step S14 of FIG. 7 (first step) and FIG. 9C)].

The reason why such a process as described above is performed is such as follows. In particular, if the wheel selected at step S13 (here, the left rear wheel 14L which is the fourth speed wheel) is acted upon by the ABS 20, then braking operation that the rotation speed of the wheel drops by more than a predetermined value with respect to an estimated vehicle body speed calculated based on the reference wheel speed, an output value of the forward-rearward acceleration sensor and so forth and the braking force decreases and thereafter the braking force having exhibited a reduced value restores the original braking force when the wheel rotation speed comes to a value in the proximity of the estimated vehicle body speed is repeated. Therefore, the rotation speed of the wheel on which the ABS 20 is acting periodically exhibits a great variation. Thus, an operation state of the ABS 20 can be decided by calculating the variation of the rotation speed of the wheel for every period.

Figure 10A:
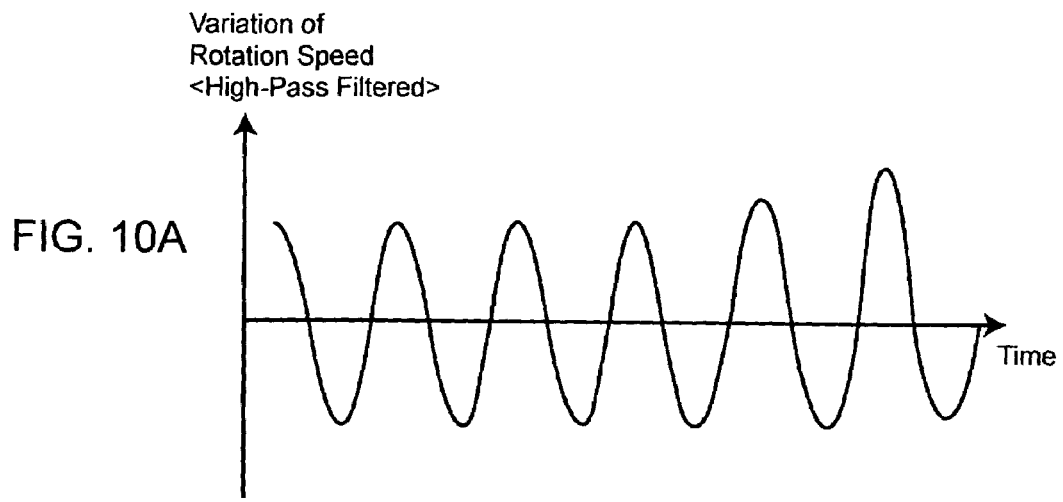
FIGS. 10A, 10B and 10C are diagrammatic views illustrating the operation decision of the ABS in the control of the vehicle driving force distribution and controlling apparatus and the vehicle driving force distribution and controlling method according to the first and second embodiment of the present invention.
Figure 10B:
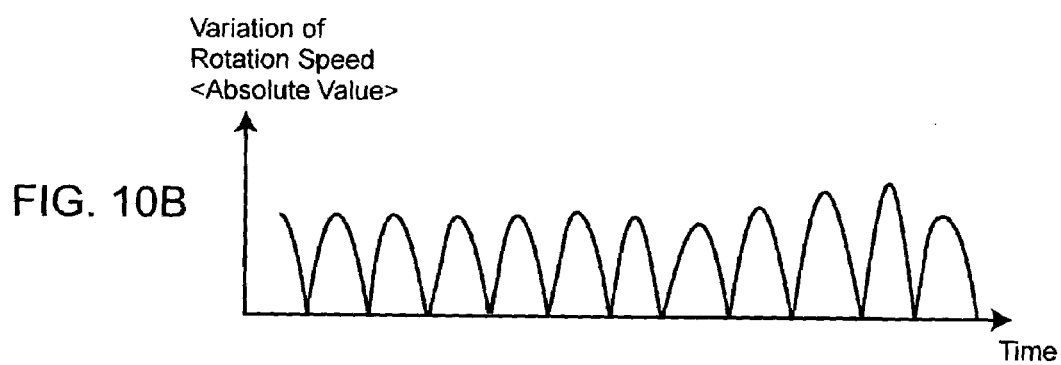
Figure 12:
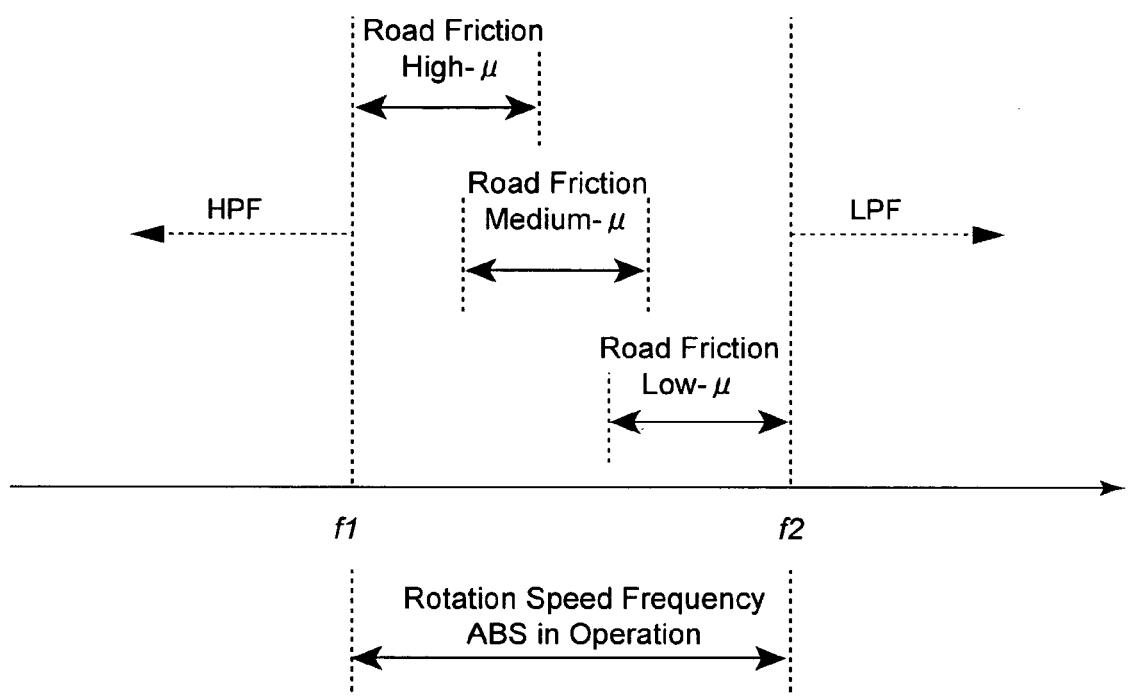
FIG. 12 is a diagrammatic view illustrating the operation decision of the ABS in the control of the vehicle driving force distribution and controlling apparatus and the vehicle driving force distribution and controlling method according to the first and second embodiment of the present invention.

Then, a high-pass filter (HPF) process is performed for a result (refer to FIG. 9C) of the change rate arithmetic operation process at step S14 to block low frequency noise (predetermined low frequency components) [refer to step S15 (third step) of FIG. 12 and FIG. 10A]. Thereafter, an absolute value of a result of the high-pass filter process [refer to step S16 (fourth step: refer to FIG. 10B)] to obtain a magnitude of the change rate.

Figure 10C:
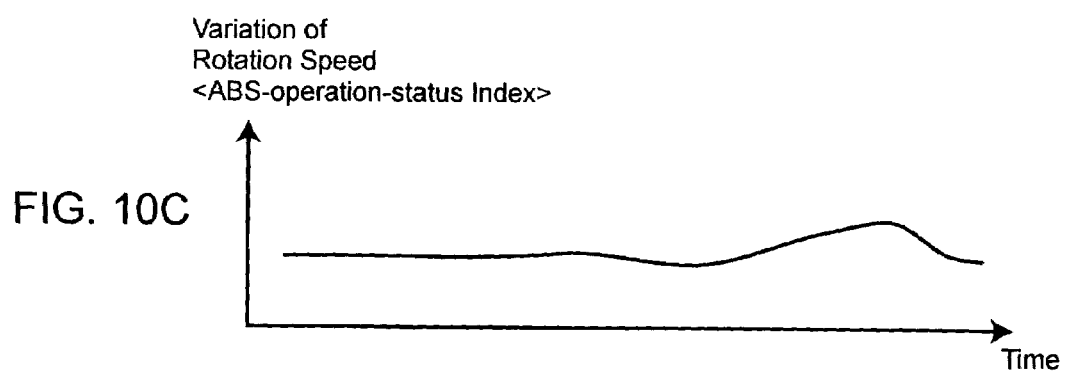

Thereafter, a result obtained by performing a low-pass filter process for the absolute values of results of the high-pass filter process obtained at step S16 to smooth the absolute values (fifth step; refer to FIG. 10C) as seen in FIG. 10C is determined as an index to be used for decision of whether or not the ABS 20 is active (that is, an operation state of the ABS 20). It is to be noted that the index is hereinafter referred to as "ABS-operation-status index". This is because, in the change rate arithmetic operation process at step S14, zero or a very low value may possibly be calculated temporarily as the change rate of the left rear wheel 14L on which the ABS 20 is acting as described herein above with reference to FIG. 10B, and the low-pass filter process is performed in order to exclude such a singular point as just described.

Here, a filter frequency $f_2$ of the low-pass filter process at step S12 and another filter frequency $f_1$ of the high-pass filter process at step S15 are described. First, the filter frequency $f_1$ of the high-pass filter for removing low frequency noise is set to a frequency which is a lower limit to a speed variation frequency which appears when the ABS 20 is active while the vehicle 1 is traveling on a road of a high road friction (a high μ road; for example, a dry asphalt road).

The filter frequency $f_2$ of the low-pass filter for removing high frequency noise is set to a frequency which is an upper limit to the speed variation frequency which appears when the ABS 20 is active while the vehicle 1 is traveling on a road of a low road friction (a low μ road;

for example, a road of compressed snow, a frozen road or the like).

This is because the speed variation frequency (oscillation components) which appears while the ABS 20 is active shifts in response to a road friction of the road. It is to be noted that, since the speed variation frequency of a wheel which appears when the ABS 20 is active while the vehicle 1 is traveling on a road of an intermediate road friction (a medium p road; for example, a wet asphalt road or the like) has an intermediate value between that in the case of a high μ road and that in the case of a low μ road described hereinabove, in order to set the filter frequencies $f_1$ and $f_2$, attention should be paid only to the speed variation frequencies of the wheel in the cases of traveling on a high μ road and a low μ road.

Then, if the ABS operation decision index is so high as to exceed upper limit threshold value (first predetermined value) HG1, then it is decided that oscillations of the frequency band which are observed when the ABS 20 operates are generated, that is, the ABS 20 is active. On the other hand, if the ABS operation decision index is lower than a lower limit threshold value (second predetermined value) HG2 lower than the upper limit threshold value HG1 given above, then it is decided that the ABS 20 is inactive. It is to be noted that the threshold values HG1 and HG2 are determined through an experiment.

Then, if it is decided by the ABS status estimator 127 that the ABS 20 is active, then the control mode for the driving force distribution mechanism (left-right wheel driving force distribution mechanism 15 and front-rear wheel driving force distribution mechanism 19) is changed over to the ABS-active mode to perform control so that the effect of the ABS 20 may not be disturbed. It is to be noted that a technique for control of the driving force distribution system which does not disturb the effect of the ABS 20 is already known, and therefore, description of the technique is omitted herein.

On the other hand, if it is decided that the ABS operation decision index is lower than the lower limit threshold value HG2, then it is decided whether or not predetermined time T elapses after the point of time (refer to an arrow mark c in FIG. 11) at which the ABS operation decision index becomes lower than the lower limit threshold value HG2. Here, if it is decided that the predetermined time T elapses, then it is decided by the ABS status estimator 127 that the ABS 20 is inactive. In other words, where the predetermined time T is set in this manner, the decision that the ABS 20 is inactive can be performed with a higher degree of certainty.

Further, even if the ABS operation decision index is lower than the upper limit threshold value HG1, and if the index is higher than the lower limit threshold value HG2 (refer to arrow marks a and b in FIG. 11), then if the decision result in the preceding operation cycle is "ABS active", then the decision result "ABS active" is maintained. Therefore, for example, even if the ABS operation decision index is staggered higher or lower than the upper limit threshold value HG1 for a short period, if it is higher than the lower limit threshold value HG2, then the decision result in the preceding operation "ABS active" is maintained. Consequently, hunting of the operation decision of the ABS 20 can be prevented.

Further, the decision process by the ABS status estimator 127 is rendered operative when the driver operates a brake pedal 26, that is, only when it is detected by a brake switch 25 that a braking operation is performed. Consequently, even if the ABS operation decision index becomes higher than the upper limit threshold value HG1 while at least one of the wheels 8L, 8R, 14L, 14R drags, if the brake pedal is not in an operated state, then the operation decision of the ABS 20 is not performed.

Accordingly, even in such a case as just described, if the ECU 18 controls the driving force distribution mechanisms 15, 19 in the standard mode, then traction of the vehicle 1 can be assured and degradation of the traveling stability can be prevented. In other words, while an operation decision of the ABS 20 which is unnecessary when the brake pedal is not operated is prevented, a decision of whether the ABS 20 is active or inactive can be performed with certainty. It is to be noted that the antiskid brake system operation decision apparatus, driving force distribution mechanisms 15, 19 and ECU 18 described above cooperatively form a driving force distribution control apparatus.

Figure 8:
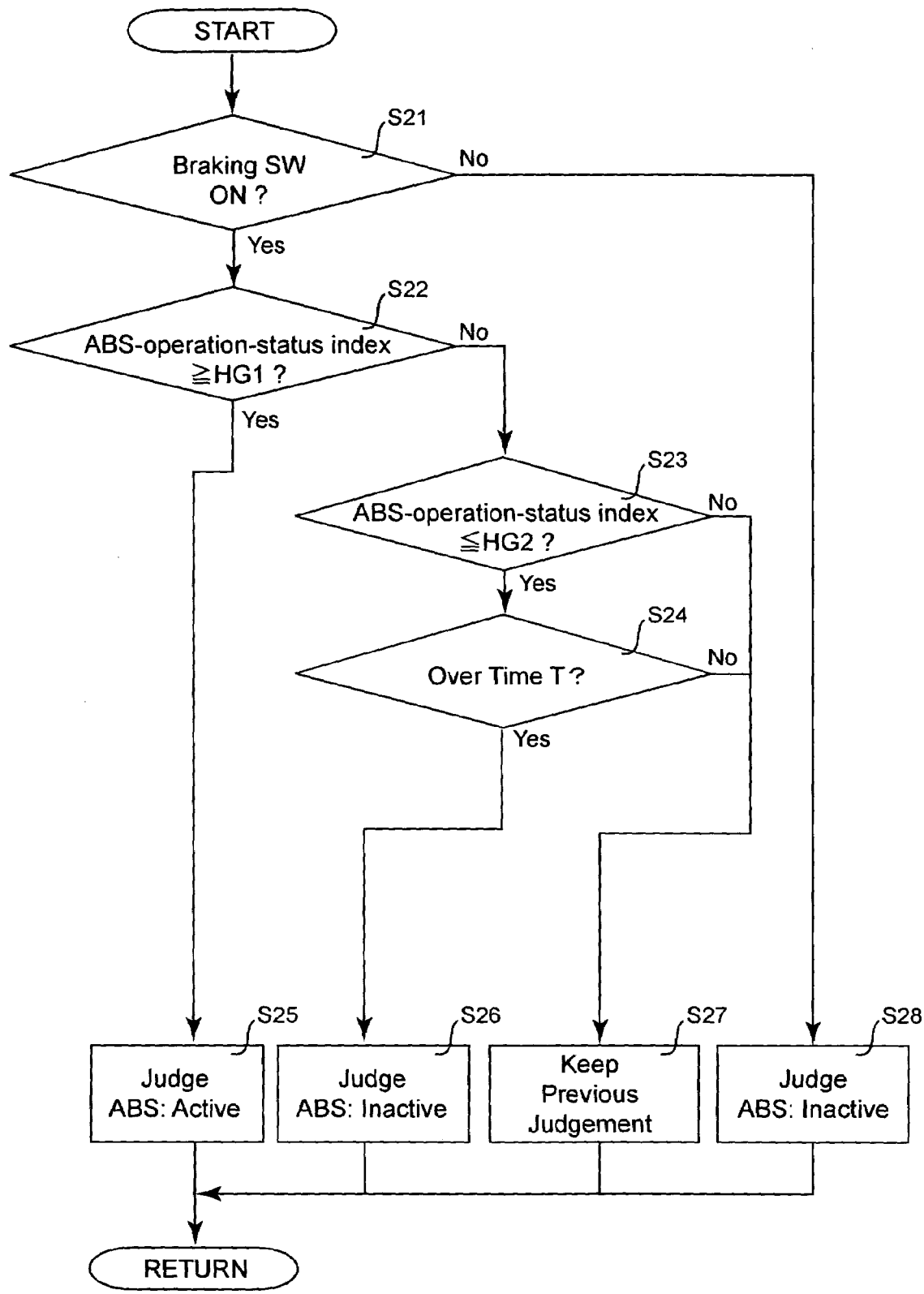
FIG. 8 is a flow chart illustrating the operation decision of the ABS in the control of the vehicle driving force distribution and controlling apparatus and the vehicle driving force distribution and controlling method according to the first and second embodiment of the present invention.

Here, a control flow is described. Referring to FIG. 8, first at step S21, it is decided whether or not the brake switch (not shown) is on. Here, if the brake switch is off (refer to the No route), then since no braking operation is performed, it is decided by the ABS status estimator 127 that the ABS 20 is inactive (step S28). On the other hand, if it is decided at step S21 that the brake switch is on, then this is a case wherein a braking operation is performed (refer to the Yes route). At this time, an ABS operation decision index described hereinabove is calculated, and it is decided whether or not the ABS operation decision index is equal to or higher than the upper limit threshold value HG1 (step S22).

If it is decided at step S22 that the ABS operation decision index is equal to or higher than the upper limit threshold value HG1 (Yes route), then it is decided by the ABS status estimator 127 that the ABS 20 is active (step S25). If this decision is made, then the ECU 18 controls the driving force distribution mechanism (left-right wheel driving force distribution mechanism 15 and front-rear wheel driving force distribution mechanism 19) so that the effect of the ABS 20 may not be disturbed. In other words, where the ABS operation decision index is equal to or higher than the upper limit threshold value HG1, it is decided that unique speed oscillations which are observed while the ABS 20 is active are generated.

On the other hand, if the ABS operation decision index is lower then the upper limit threshold value HG1, then the processing advances from step S22 to step S23, at which it is decided whether or not the ABS operation decision index is equal to or lower than the lower limit threshold value HG2.

Here, if it is decided that the ABS operation decision index is equal to or lower than the lower limit threshold value HG2, then the processing advances to step S24 (refer to the Yes route), at which it is decided whether or not the predetermined time T elapses after the point of time at which the ABS operation decision index becomes equal to or lower than the lower limit threshold value HG2. If it is decided that the predetermined time T elapses (refer to the Yes route), then it is decided by the ABS status estimator 127 that the ABS 20 is inactive(step S26).

In other words, the fact that the condition at step S26 is satisfied signifies a condition that the predetermined time T elapses after the ABS operation decision index calculated by the speed variation arithmetic operation of the fourth wheel speed becomes lower than the lower limit threshold value HG2. This is a case wherein, even if some variations of the wheel speed are generated, it is decided that the variations of the wheel speed do not originate from operation of the ABS 20.

On the other hand, if it is decided at step S23 that the ABS operation decision index is higher than the lower limit threshold value HG2 (refer to the No route), then the decision result in the preceding operation cycle is maintained (step S127). It is to be noted that, when the condition at step S127 is satisfied by the first braking operation after the vehicle starts traveling, it is decided that the ABS 20 is inactive.

Accordingly, for example, even if the ABS operation decision index is lower than the upper limit threshold value HG1 (refer to the No route at step S22), if it is higher than the lower limit threshold value HG2, then the decision result that the ABS is active is maintained if the decision result in the preceding cycle is "ABS active".

Figure 11:
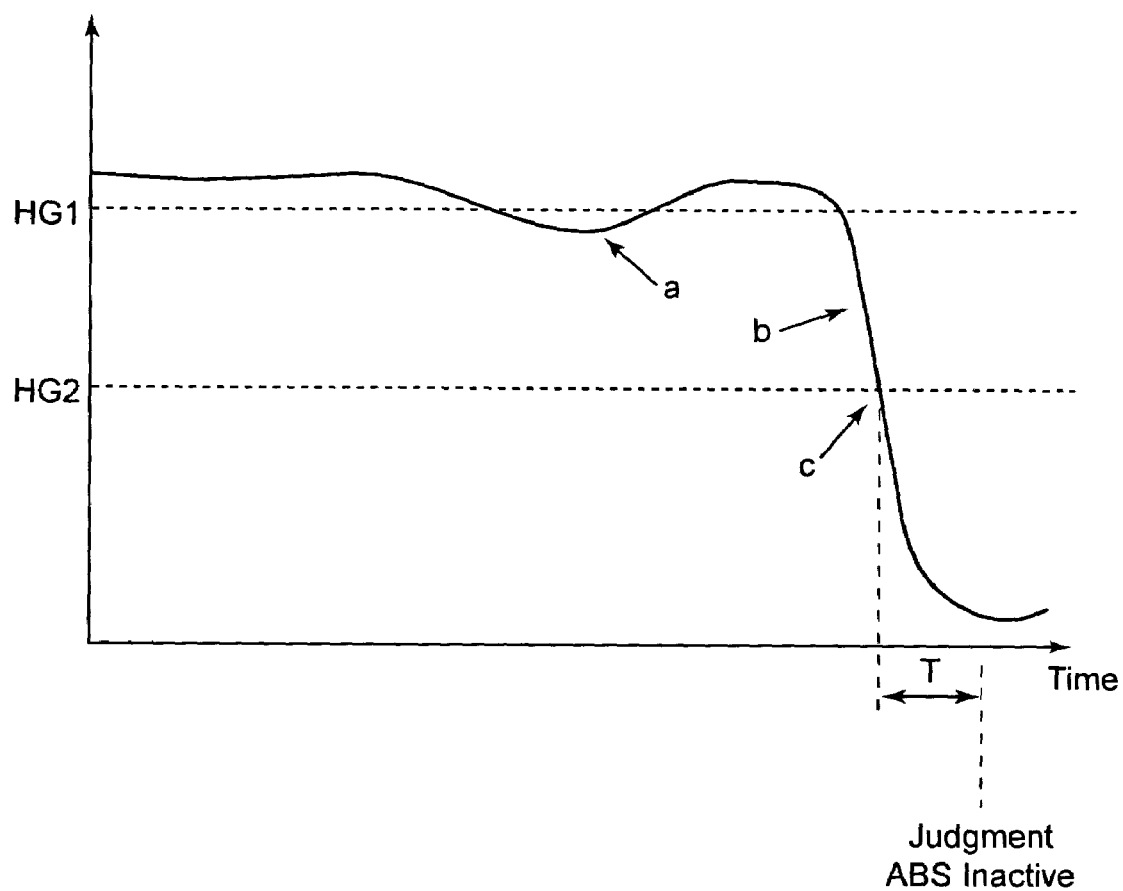
FIG. 11 is a diagrammatic view illustrating the operation decision of the ABS in the control of the vehicle driving force distribution and controlling apparatus and the vehicle driving force distribution and controlling method according to the first and second embodiment of the present invention.

Accordingly, since a hysteresis is set between the upper limit threshold value HG1 and the lower limit threshold value HG2 as can be recognized from the flow chart of FIG. 8 and the graph of FIG. 11, hunting of the operation decision of the ABS can be prevented.

Further, the ECU 18 can decide based on the oscillation components of the speeds of rotation of the wheels 8L, 8R, 14L, 14R whether or not the ABS 20 is active without receiving a signal representative of whether the ABS 20 is active or inactive from the ECU 18. Consequently, even if the mutual communication between the ABS controller 22 and the ECU 18 is disabled, the control mode for the driving force distribution mechanisms 15, 19 can be changed over precisely in response to the operation state of the ABS 20. Consequently, the effect of the ABS 20 can be obtained appropriately.

Further, since whether the ABS 20 is active or inactive is decided based on the oscillation components of the wheel 14L which is rotating most slowly among the wheels 8L, 8R, 14L, 14R, even if the wheel speeds of the wheels have a dispersion, it can be decided with certainty whether the ABS 20 is active or inactive.

Further, whether the ABS 20 is active or inactive can be determined with certainty based on the wheel speeds which are a factor which can be measured comparatively readily.

Further, since the operation decision of the ABS 20 is performed only when the driver performs a braking operation, the control load is reduced, and the ABS status estimator 127 can decide efficiently through low power consumption whether the ABS 20 is active or inactive.

Further, since the ECU 18 includes the ABS status estimator 127 built therein, the ECU 18 can change over the control mode with certainty and appropriately in response to an operation condition of the ABS 20 to control the driving force distribution mechanisms 15, 19.

The operation state of the ABS 20 can be decided by a reliable and simple technique that vibration components of the speed of rotation of one of the wheels 8L, 8R, 14L, 14R are extracted at the first step (step S14) and then an ABS operation decision index is calculated at the second step (steps S15 to S17) based on the oscillation components obtained at the first step.

Consequently, by raising the reliability of the driving force distribution mechanisms 15, 19 which are apparatus for performing control which disturbs the effect of the ABS 20 when the ABS 20 is inactive, the effect of the ABS 20 can be obtained at a suitable timing and with certainty, and the safety and the traveling stability of the vehicle 1 can be raised significantly. Also the reliability of various vehicle-carried equipments set so as to operate based on operation of the ABS 20 (for example, an ABS indicator, a pre-tensioned seat belt and so forth) can be raised.

Further, since the second step described above includes a third step (step S15) of applying a high-pass filter to the variation of the wheel rotation speed which is an oscillation component to block predetermined low frequency components, a fourth step (step S16) of calculating an absolute value of the change rate obtained at the third step, and a fifth step (step S17) of applying a low-pass filter to the absolute value of the change rate obtained at the fourth step to block predetermined high frequency components, the ABS operation decision index can be calculated with a high degree of accuracy.

Further, since it is decided that the ABS 20 is active when the ABS operation decision index is equal to or higher than the upper limit threshold value HG1 whereas it is decided that the ABS 20 is inactive when the ABS operation decision index is equal to or lower than the lower limit threshold value HG2 which is lower than the upper limit threshold value HG1, it can be decided with certainty whether or not the ABS 20 is active. Further, hunting of such decision can be prevented.

Further, when the ABS operation decision index is lower than the upper limit threshold value HG1 and higher than the lower limit threshold value HG2 which is lower than the upper limit threshold value HG1, the decision result in the preceding cycle is maintained. Consequently, whether or not the ABS 20 is active can be decided accurately, and further, hunting of such decision can be prevented.

It is to be noted that, while an example wherein the ABS status estimator 127 is built in the ECU 18 is described above, the configuration of the ABS status estimator 127 is not limited to this, but it may be provided independently of the ECU 18 or may otherwise be provided in a controller of some other apparatus (for example, a transmission).

Further, while a case wherein an ABS operation decision index is calculated based on the speed of rotation of the wheel whose rotation speed is lowest and an operation decision of the ABS is performed is described, the ABS operation decision index may be calculated otherwise based on the speed of rotation of the wheel whose rotation is second lowest may be calculated to perform an ABS operation decision. Alternatively, the ABS operation decision index may be calculated based on both of the speeds of rotation of the wheels whose rotation is lowest and second lowest may be calculated to perform an ABS operation decision.

Furthermore, the ABS operation decision index may be calculated for each of the wheels based on the speeds of rotation of all of the wheels such that, when any of the ABS operation decision indexes of the wheels is equal to or higher than the upper limit threshold value HG1, it is decided that the ABS 20 is active.

Further, if the characteristic of each of the filters used for calculation of the ABS operation decision index is suitably changed taking the current traveling state of the vehicle, the road friction of the road on which the vehicle is traveling and so forth into consideration, then operation of the ABS can be decided with a higher degree of accuracy.

Further, the threshold values (upper limit threshold value HG1 and lower limit threshold value HG2) for the ABS operation decision index may be varied in response to the road friction $\mu$ calculated by the road friction estimating unit 24 which estimates the road friction $\mu$. In this instance, if, when the road friction $\mu$ is high, the threshold values are set to high values whereas, when the road friction $\mu$ is low, the threshold values are set to low values, then operation of the ABS can be decided with a higher degree of accuracy.

Further, while the foregoing description is given taking a four-wheeled vehicle into consideration, similar effects can be anticipated even if the present invention is applied, for example, to vehicles having three or less wheels or vehicles having five or more wheels.

The present invention is not limited to the embodiments specifically described above, and variations and modifications can be made without departing from the scope of the present invention.

What is claimed is:

1. A driving force distribution and controlling apparatus for a vehicle for controlling driving force to be transmitted from an engine to wheels, comprising:
   a driving force distribution mechanism for variably transmitting the driving force from the engine to the wheels;
   a braking force controlling element for controlling braking force to the wheels in response to a slip state between the wheels and a road;
   a road friction estimation element for estimating a road friction of the road; and
   a driving force distribution controlling element for controlling, in order to adjust the driving force to be transmitted to the wheels, operation of said driving force distribution mechanism in response to a traveling state of the vehicle and for changing a control condition of said driving force distribution mechanism in accordance with the road friction estimated by said road friction estimation element while said braking force controlling element operates.

2. The driving force distribution and controlling apparatus for a vehicle as claimed in claim 1, wherein said driving force distribution controlling element controls, while said braking force controlling element does not operate, operation of said driving force distribution mechanism in response to a first control mode, but controls, while said braking force controlling element operates, operation of said driving force distribution mechanism in response to a second control mode set corresponding to operation of said braking force controlling element, and changes a control condition of the second control mode in response to the road friction estimated by said road friction estimation element.

3. The driving force distribution and controlling apparatus for a vehicle as claimed in claim 2, wherein said driving force distribution controlling element sets the second control mode so that degrees of affinity, which corresponds to the operation of said braking force controlling element, decrease as the road friction estimated by said road friction estimation element increases.

4. The driving force distribution and controlling apparatus for a vehicle as claimed in claim 2, wherein said driving force distribution controlling element controls the operation of said driving force distribution mechanism with a control amount according to a rotational speed difference at least between the front and rear wheels or between the left and light wheels of the vehicle, the control amount according to the rotational speed difference by said second control mode being set lower than that in response to the rotational speed difference by said first control mode.

5. The driving force distribution and controlling apparatus for a vehicle as claimed in claim 4, wherein the control amount according to the rotational speed difference by said second control mode is set to a higher value as the road friction increases.

6. The driving force distribution and controlling apparatus for a vehicle as claimed in claim 5, wherein, where the road friction estimated by said road friction estimation element is lower than a predetermined value when said second control mode is executed by the operation of said braking force controlling element, said driving force distribution controlling element controls the operation of said driving force distribution mechanism only in accordance with the control amount according to the rotational speed difference.

7. The driving force distribution and controlling apparatus for a vehicle as claimed in claim 2, wherein said driving force distribution mechanism includes:
   a front-rear wheel driving force distribution mechanism capable of changing distribution of the driving force to the front and rear wheels of the vehicle; and
   a left-right wheel driving force distribution mechanism capable of changing distribution of the driving force to the left and right wheels of the vehicle; and
   said driving force distribution controlling element sets, where the road friction estimated by said road estimation element is higher than a predetermined value when said second control mode is executed by the operation of said braking force controlling element, degrees of affinity, which corresponds to the operation of said braking force controlling element in the driving force distribution control by said front-rear wheel driving force distribution mechanism, higher than that corresponding to the operation of said braking force controlling element in the driving force distribution control by said left-right wheel driving force distribution mechanism.

8. The driving force distribution and controlling apparatus for a vehicle as claimed in claim 2, wherein, where the road friction estimated by said road friction estimation element is higher than a predetermined value when said second control mode is executed by the operation of said braking force controlling element, said driving force distribution controlling element changes the control condition of said driving force distribution mechanism so as to become substantially same as that by said first control mode.

9. The driving force distribution and controlling apparatus for a vehicle as claimed in claim 2, wherein said driving force distribution mechanism includes:
   a front-rear wheel driving force distribution mechanism capable of changing distribution of the driving force to the front and rear wheels of the vehicle; and
   a left-right wheel driving force distribution mechanism capable of changing distribution of the driving force to the left and right wheels of the vehicle; and
   said driving force distribution controlling element changes, where the road friction estimated by said road friction estimation element is higher than a predetermined value when said second control mode is executed by the operation of said braking force controlling element, the control condition of said left-right wheel driving force distribution mechanism so as to become same as or substantially same as that by said first control mode.

10. The driving force distribution and controlling apparatus for a vehicle as claimed in claim 1, wherein said driving force distribution mechanism is a front-rear wheel driving force distribution mechanism capable of changing distribution of the driving force to the front and rear wheels of the vehicle.

11. The driving force distribution and controlling apparatus for a vehicle as claimed in claim 1, wherein said driving force distribution mechanism is a left-right wheel driving force distribution mechanism capable of changing distribution of the driving force to the left and right wheels of the vehicle.

12. The driving force distribution and controlling apparatus for a vehicle as claimed in claim 1, further comprising:
   wheel speed detection elements for detecting rotational speeds of the wheels; and a braking state estimation element for estimating an operation state of said braking force controlling element based on vibration components of the rotational speeds of the wheels detected by said wheel speed detection elements.

13. The driving force distribution and controlling apparatus for a vehicle as claimed in claim 12, wherein said braking state estimation element estimates the operation state of said braking force controlling element based on a vibration component of at least one of the lowest wheel rotational speed and the second lowest wheel rotational speed from among the rotational speeds of the wheels detected by said wheel speed detection elements.

14. The driving force distribution and controlling apparatus for a vehicle as claimed in claim 12, wherein said braking state estimation element estimates the vibration components of the wheels based on variations of the rotational speeds of the wheels detected by said wheel speed detection elements.

15. The driving force distribution and controlling apparatus for a vehicle as claimed in claim 12, wherein said braking state estimation element estimates the operation state of said braking force controlling element only when it is detected that a braking operation is performed.

16. A driving force distribution and controlling method for a vehicle for controlling operation of a driving force distribution mechanism which variably transmits driving force from an engine to wheels to control the driving force to be transmitted from the engine to the wheels in response to a traveling state of the vehicle, comprising steps of:
    estimating an operation state of a braking force controlling element for controlling braking force to the wheels in response to a slip state between the wheels and a road;
    estimating a road friction of the road; and
    changing a control condition of said driving force distribution mechanism in response to the road friction estimated when said braking force controlling element operates.

17. The driving force distribution and controlling method for the vehicle as claimed in claim 16, wherein the operation of said driving force distribution mechanism is controlled in response to a first control mode while said braking force controlling element does not operate, but the operation of said driving force distribution mechanism is controlled in response to a second control mode set corresponding to the operation of said braking force controlling element while said braking force controlling element operates, and a control condition of said second control mode is changed in response to the estimated road friction.

18. The driving force distribution and controlling method for the vehicle as claimed in claim 17, wherein said second control mode is set so that degrees of affinity, which corresponds to the operation of said braking force controlling element, decrease as the estimated road friction increases.

19. The driving force distribution and controlling method for the vehicle as claimed in claim 17, wherein, where the estimated road friction is higher than a predetermined value when said second control mode is executed by the operation of said braking force controlling element, the control condition of said driving force distribution mechanism is changed so as to become substantially same as that by said first control mode.

* * * * *